US009250676B2

(12) United States Patent
Lucas et al.

(10) Patent No.: US 9,250,676 B2
(45) Date of Patent: *Feb. 2, 2016

(54) POWER FAILURE ARCHITECTURE AND VERIFICATION

(71) Applicant: SanDisk Enterprise IP LLC, Milpitas, CA (US)

(72) Inventors: Gregg S. Lucas, Tucson, AZ (US); Kenneth B. Delpapa, Natick, MA (US); Robert W. Ellis, Phoenix, AZ (US)

(73) Assignee: SANDISK ENTERPRISE IP LLC, Milpitas, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 14/135,386

(22) Filed: Dec. 19, 2013

(65) Prior Publication Data

US 2015/0153802 A1 Jun. 4, 2015

Related U.S. Application Data

(60) Provisional application No. 61/910,163, filed on Nov. 29, 2013.

(51) Int. Cl.
G06F 11/00 (2006.01)
G06F 1/30 (2006.01)
G06F 11/14 (2006.01)

(52) U.S. Cl.
CPC .............. *G06F 1/30* (2013.01); *G06F 11/1402* (2013.01)

(58) Field of Classification Search
CPC ....... G06F 11/1412; G06F 1/30; G06F 11/14; G06F 12/0246; G06F 11/1441; G06F 2212/1032; G06F 31/0653; G06F 11/2017; G06F 3/0619
See application file for complete search history.

(56) References Cited

U.S. PATENT DOCUMENTS 4,322,766 A 3/1982 Becker et al.
4,528,458 A 7/1985 Nelson et al.
(Continued)

FOREIGN PATENT DOCUMENTS

EP 1465203 A1 10/2004
EP 1 956 489 A2 8/2008
(Continued)

OTHER PUBLICATIONS

International Search Report and Written Opinion dated May 27, 2015, received in International Patent Application No. PCT/US2014/067476, which corresponds to U.S. Appl. No. 14/135,417, 14 pages. (Lucas).

(Continued)

*Primary Examiner* — Amine Riad
(74) *Attorney, Agent, or Firm* — Morgan, Lewis & Bockius LLP

(57) ABSTRACT

The various implementations described herein include systems, methods and devices used to protect data in a storage device. In one aspect, a method includes, performing a soft power fail operation on a section of the device, the operation including: (1) signaling a power test condition to a first controller on the storage device; (2) providing one or more controllers with power from an energy storage device, where the energy storage device is distinct from a power supply used during normal operation; (3) signaling a power fail condition to the one or more controllers on the storage device, where the one or more controllers communicate with the first controller and correspond to said section of the storage device, and where, in response to the power fail condition, each of the one or more controllers performs a data hardening operation; and (4) resuming normal operation on said section of the storage device.

27 Claims, 10 Drawing Sheets

(56) References Cited

U.S. PATENT DOCUMENTS

| | | | |
|---|---|---|---|
| 4,600,962 A | 7/1986 | Bliehall | |
| 4,916,652 A | 4/1990 | Schwarz et al. | |
| 5,193,176 A | 3/1993 | Brandin | |
| 5,519,847 A | 5/1996 | Fandrich et al. | |
| 5,530,705 A | 6/1996 | Malone, Sr. | |
| 5,537,555 A | 7/1996 | Landry et al. | |
| 5,551,003 A | 8/1996 | Mattson et al. | |
| 5,568,429 A | 10/1996 | D'Souza et al. | |
| 5,657,332 A | 8/1997 | Auclair et al. | |
| 5,666,114 A | 9/1997 | Brodie et al. | |
| 5,832,515 A * | 11/1998 | Ledain et al. | |
| 5,943,692 A | 8/1999 | Marberg et al. | |
| 5,982,664 A | 11/1999 | Watanabe | |
| 5,996,054 A * | 11/1999 | Ledain et al. ................. 711/203 | |
| 6,000,006 A | 12/1999 | Bruce et al. | |
| 6,016,560 A | 1/2000 | Wada et al. | |
| 6,295,592 B1 | 9/2001 | Jeddeloh | |
| 6,311,263 B1 | 10/2001 | Barlow et al. | |
| 6,393,584 B1 | 5/2002 | McLaren et al. | |
| 6,442,076 B1 | 8/2002 | Roohparvar | |
| 6,449,625 B1 | 9/2002 | Wang | |
| 6,484,224 B1 | 11/2002 | Robins et al. | |
| 6,597,073 B1 | 7/2003 | Check | |
| 6,678,788 B1 | 1/2004 | O'Connell | |
| 6,738,268 B1 | 5/2004 | Sullivan et al. | |
| 6,757,768 B1 | 6/2004 | Potter et al. | |
| 6,775,792 B2 | 8/2004 | Ulrich et al. | |
| 6,810,440 B2 | 10/2004 | Micalizzi, Jr. et al. | |
| 6,836,808 B2 | 12/2004 | Bunce et al. | |
| 6,836,815 B1 | 12/2004 | Purcell et al. | |
| 6,842,436 B2 | 1/2005 | Moeller | |
| 6,871,257 B2 | 3/2005 | Conley et al. | |
| 6,895,464 B2 | 5/2005 | Chow et al. | |
| 6,978,343 B1 | 12/2005 | Ichiriu | |
| 6,981,205 B2 | 12/2005 | Fukushima et al. | |
| 6,988,171 B2 | 1/2006 | Beardsley et al. | |
| 7,020,017 B2 | 3/2006 | Chen et al. | |
| 7,032,123 B2 | 4/2006 | Kane et al. | |
| 7,043,505 B1 | 5/2006 | Teague et al. | |
| 7,100,002 B2 | 8/2006 | Shrader | |
| 7,111,293 B1 | 9/2006 | Hersh et al. | |
| 7,162,678 B2 | 1/2007 | Saliba | |
| 7,173,852 B2 | 2/2007 | Gorobets et al. | |
| 7,184,446 B2 | 2/2007 | Rashid et al. | |
| 7,516,292 B2 | 4/2009 | Kimura et al. | |
| 7,523,157 B2 | 4/2009 | Aguilar, Jr. et al. | |
| 7,571,277 B2 | 8/2009 | Mizushima | |
| 7,574,554 B2 | 8/2009 | Tanaka et al. | |
| 7,596,643 B2 | 9/2009 | Merry, Jr. et al. | |
| 7,681,106 B2 | 3/2010 | Jarrar et al. | |
| 7,685,494 B1 | 3/2010 | Varnica et al. | |
| 7,707,481 B2 | 4/2010 | Kirschner et al. | |
| 7,761,655 B2 | 7/2010 | Mizushima et al. | |
| 7,774,390 B2 | 8/2010 | Shin | |
| 7,840,762 B2 | 11/2010 | Oh et al. | |
| 7,870,326 B2 | 1/2011 | Shin et al. | |
| 7,870,338 B2 | 1/2011 | Iida et al. | |
| 7,890,818 B2 | 2/2011 | Kong et al. | |
| 7,913,022 B1 | 3/2011 | Baxter | |
| 7,925,960 B2 | 4/2011 | Ho et al. | |
| 7,934,052 B2 | 4/2011 | Prins et al. | |
| 7,971,112 B2 | 6/2011 | Murata | |
| 7,978,516 B2 | 7/2011 | Olbrich et al. | |
| 7,996,642 B1 | 8/2011 | Smith | |
| 8,001,419 B2 | 8/2011 | Killian et al. | |
| 8,032,724 B1 | 10/2011 | Smith | |
| 8,412,985 B1 | 4/2013 | Bowers et al. | |
| 2002/0024846 A1 | 2/2002 | Kawahara et al. | |
| 2002/0083299 A1 | 6/2002 | Van Huben et al. | |
| 2002/0152305 A1 | 10/2002 | Jackson et al. | |
| 2002/0162075 A1 | 10/2002 | Talagala et al. | |
| 2002/0165896 A1 | 11/2002 | Kim | |
| 2003/0041299 A1 | 2/2003 | Kanazawa et al. | |
| 2003/0043829 A1 | 3/2003 | Rashid et al. | |
| 2003/0074592 A1 | 4/2003 | Hasegawa | |
| 2003/0088805 A1 | 5/2003 | Majni et al. | |
| 2003/0093628 A1 | 5/2003 | Matter et al. | |
| 2003/0126494 A1 | 7/2003 | Strasser | |
| 2003/0188045 A1 | 10/2003 | Jacobson | |
| 2003/0189856 A1 | 10/2003 | Cho et al. | |
| 2003/0198100 A1 | 10/2003 | Matsushita et al. | |
| 2003/0212719 A1 | 11/2003 | Yasuda et al. | |
| 2004/0024957 A1 | 2/2004 | Lin et al. | |
| 2004/0024963 A1 | 2/2004 | Talagala et al. | |
| 2004/0073829 A1 | 4/2004 | Olarig | |
| 2004/0153902 A1 | 8/2004 | Machado et al. | |
| 2004/0181734 A1 | 9/2004 | Saliba | |
| 2004/0199714 A1 | 10/2004 | Estakhri et al. | |
| 2004/0237018 A1 | 11/2004 | Riley | |
| 2004/0252670 A1 | 12/2004 | Rong et al. | |
| 2005/0060456 A1 | 3/2005 | Shrader et al. | |
| 2005/0060501 A1 | 3/2005 | Shrader | |
| 2005/0114587 A1 | 5/2005 | Chou et al. | |
| 2005/0134288 A1 | 6/2005 | Monter et al. | |
| 2005/0172065 A1 | 8/2005 | Keays | |
| 2005/0172207 A1 | 8/2005 | Radke et al. | |
| 2005/0193161 A1 | 9/2005 | Lee et al. | |
| 2005/0201148 A1 | 9/2005 | Chen et al. | |
| 2005/0223206 A1 | 10/2005 | Janzen et al. | |
| 2005/0257120 A1 | 11/2005 | Gorobets et al. | |
| 2005/0273560 A1 | 12/2005 | Hulbert et al. | |
| 2005/0289314 A1 | 12/2005 | Adusumilli et al. | |
| 2006/0039196 A1 | 2/2006 | Gorobets et al. | |
| 2006/0053246 A1 | 3/2006 | Lee | |
| 2006/0085671 A1 | 4/2006 | Majni et al. | |
| 2006/0108875 A1 | 5/2006 | Grundmann et al. | |
| 2006/0136570 A1 | 6/2006 | Pandya | |
| 2006/0156177 A1 | 7/2006 | Kottapalli et al. | |
| 2006/0195650 A1 | 8/2006 | Su et al. | |
| 2006/0259528 A1 | 11/2006 | Dussud et al. | |
| 2007/0011413 A1 | 1/2007 | Nonaka et al. | |
| 2007/0058446 A1 | 3/2007 | Hwang et al. | |
| 2007/0061597 A1 | 3/2007 | Holtzman et al. | |
| 2007/0076479 A1 | 4/2007 | Kim et al. | |
| 2007/0081408 A1 | 4/2007 | Kwon et al. | |
| 2007/0083697 A1 | 4/2007 | Birrell et al. | |
| 2007/0083779 A1 | 4/2007 | Misaka et al. | |
| 2007/0113019 A1 | 5/2007 | Beukema et al. | |
| 2007/0133312 A1 | 6/2007 | Roohparvar | |
| 2007/0147113 A1 | 6/2007 | Mokhlesi et al. | |
| 2007/0150790 A1 | 6/2007 | Gross et al. | |
| 2007/0157064 A1 | 7/2007 | Falik et al. | |
| 2007/0174579 A1 | 7/2007 | Shin | |
| 2007/0208901 A1 | 9/2007 | Purcell et al. | |
| 2007/0234143 A1 | 10/2007 | Kim | |
| 2007/0245061 A1 | 10/2007 | Harriman | |
| 2007/0277036 A1 | 11/2007 | Chamberlain et al. | |
| 2007/0291556 A1 | 12/2007 | Kamei | |
| 2007/0294496 A1 | 12/2007 | Goss et al. | |
| 2007/0300130 A1 | 12/2007 | Gorobets | |
| 2008/0019182 A1 | 1/2008 | Yanagidaira et al. | |
| 2008/0022163 A1 | 1/2008 | Tanaka et al. | |
| 2008/0052446 A1 | 2/2008 | Lasser et al. | |
| 2008/0077841 A1 | 3/2008 | Gonzalez et al. | |
| 2008/0077937 A1 | 3/2008 | Shin et al. | |
| 2008/0086677 A1 | 4/2008 | Yang et al. | |
| 2008/0144371 A1 | 6/2008 | Yeh et al. | |
| 2008/0147964 A1 | 6/2008 | Chow et al. | |
| 2008/0147998 A1 | 6/2008 | Jeong | |
| 2008/0148124 A1 | 6/2008 | Zhang et al. | |
| 2008/0163030 A1 | 7/2008 | Lee | |
| 2008/0168319 A1 | 7/2008 | Lee et al. | |
| 2008/0170460 A1 | 7/2008 | Oh et al. | |
| 2008/0229000 A1 | 9/2008 | Kim | |
| 2008/0229003 A1 | 9/2008 | Mizushima et al. | |
| 2008/0229176 A1 | 9/2008 | Arnez et al. | |
| 2008/0270680 A1 | 10/2008 | Chang | |
| 2008/0282128 A1 | 11/2008 | Lee et al. | |
| 2008/0285351 A1 | 11/2008 | Shlick et al. | |
| 2009/0003058 A1 | 1/2009 | Kang | |
| 2009/0037652 A1 | 2/2009 | Yu et al. | |
| 2009/0144598 A1 | 6/2009 | Yoon et al. | |
| 2009/0168525 A1 | 7/2009 | Olbrich et al. | |
| 2009/0172258 A1 | 7/2009 | Olbrich et al. |

(56) References Cited

U.S. PATENT DOCUMENTS

| | | | |
|---|---|---|---|
| 2009/0172259 A1 | 7/2009 | Prins et al. | |
| 2009/0172260 A1 | 7/2009 | Olbrich et al. | |
| 2009/0172261 A1 | 7/2009 | Prins et al. | |
| 2009/0172262 A1 | 7/2009 | Olbrich et al. | |
| 2009/0172308 A1 | 7/2009 | Prins et al. | |
| 2009/0172335 A1 | 7/2009 | Kulkarni et al. | |
| 2009/0172499 A1 | 7/2009 | Olbrich et al. | |
| 2009/0193058 A1 | 7/2009 | Reid | |
| 2009/0207660 A1 | 8/2009 | Hwang et al. | |
| 2009/0222708 A1 | 9/2009 | Yamaga | |
| 2009/0296466 A1 | 12/2009 | Kim et al. | |
| 2009/0296486 A1 | 12/2009 | Kim et al. | |
| 2009/0319864 A1 | 12/2009 | Shrader | |
| 2010/0008175 A1 | 1/2010 | Sweere et al. | |
| 2010/0011261 A1* | 1/2010 | Cagno et al. | 714/719 |
| 2010/0052426 A1 | 3/2010 | Carter et al. | |
| 2010/0052625 A1* | 3/2010 | Cagno et al. | 320/166 |
| 2010/0061151 A1 | 3/2010 | Miwa et al. | |
| 2010/0095048 A1 | 4/2010 | Bechtolsheim et al. | |
| 2010/0103737 A1 | 4/2010 | Park | |
| 2010/0199125 A1 | 8/2010 | Reche | |
| 2010/0202196 A1 | 8/2010 | Lee et al. | |
| 2010/0208521 A1 | 8/2010 | Kim et al. | |
| 2010/0217920 A1 | 8/2010 | Song | |
| 2010/0262889 A1 | 10/2010 | Bains | |
| 2010/0281207 A1 | 11/2010 | Miller et al. | |
| 2010/0281342 A1 | 11/2010 | Chang et al. | |
| 2011/0066872 A1 | 3/2011 | Miller et al. | |
| 2011/0083060 A1 | 4/2011 | Sakurada et al. | |
| 2011/0085657 A1 | 4/2011 | Matthews, Jr. | |
| 2011/0113281 A1 | 5/2011 | Zhang et al. | |
| 2011/0131444 A1 | 6/2011 | Buch et al. | |
| 2011/0205823 A1 | 8/2011 | Hemink et al. | |
| 2011/0213920 A1 | 9/2011 | Frost et al. | |
| 2011/0228601 A1 | 9/2011 | Olbrich et al. | |
| 2011/0231600 A1 | 9/2011 | Tanaka et al. | |
| 2012/0054456 A1 | 3/2012 | Grube et al. | |
| 2012/0084492 A1* | 4/2012 | Stenfort | 711/103 |
| 2012/0089855 A1 | 4/2012 | Beckhoff et al. | |
| 2012/0096217 A1 | 4/2012 | Son et al. | |
| 2012/0195126 A1 | 8/2012 | Roohparvar | |
| 2012/0221801 A1 | 8/2012 | Okawa | |
| 2012/0239976 A1 | 9/2012 | Cometti et al. | |
| 2012/0271990 A1 | 10/2012 | Chen et al. | |
| 2013/0019076 A1 | 1/2013 | Amidi et al. | |
| 2013/0336081 A1 | 12/2013 | Sheets et al. | |
| 2014/0001861 A1 | 1/2014 | Mann et al. | |
| 2014/0008970 A1 | 1/2014 | Yamaguchi | |
| 2014/0012522 A1 | 1/2014 | Colombi et al. | |
| 2014/0215103 A1* | 7/2014 | Cohen et al. | 710/23 |
| 2014/0269053 A1* | 9/2014 | Chen et al. | 365/185.03 |
| 2015/0052397 A1 | 2/2015 | Nakamura et al. | |

FOREIGN PATENT DOCUMENTS

| | | |
|---|---|---|
| JP | 2002-532806 S | 10/2002 |
| WO | WO 2007/036834 A2 | 4/2007 |
| WO | WO 2007/080586 A2 | 7/2007 |
| WO | WO 2008/121553 A1 | 10/2008 |
| WO | WO 2008/121577 A1 | 10/2008 |
| WO | WO 2009/028281 A1 | 3/2009 |
| WO | WO 2009/032945 A1 | 3/2009 |
| WO | WO 2009/058140 A1 | 5/2009 |
| WO | WO 2009/134576 A1 | 11/2009 |

OTHER PUBLICATIONS

IBM Corporation, "Systems Management, Work Management," Version 5, Release 4, 9th Edition, Feb. 2006, pp. 1-21.
Texas Instruments, "Power Management IC for Digital Set Top Boxes," SLVSA10A, Sep. 2009, pp. 1-22.
International Search Report and Written Opinion dated Jan. 26, 2016, received in International Patent Application No. PCT/US2014/059118, which corresponds to U.S. Appl. No. 14/135,371, 11 pages (Lucas).
International Search Report and Written Opinion dated Jul. 26, 2013, received in International Patent Application No. PCT/US2013/035162, which corresponds to U.S. Appl. No. 13/855,567, 7 pages (Ellis).
International Preliminary Report on Patentability dated Oct. 30, 2014, received in International Patent Application No. PCT/US2013/035162, which corresponds to U.S. Appl. No. 13/855,567, 4 pages (Ellis).
Barr, Introduction to Watchdog Timers, Oct. 2001, 3 pgs.
Canim, Buffered Bloom ilters on Solid State Storage, ADMS*10, Singapore, Sep. 13-17, 2010, 8 pgs.
Kang, A Multi-Channel Architecture for High-Performance NAND Flash-Based Storage System, J. Syst. Archit., 53, 9, Sep. 2007, 15 pgs.
Kim, A Space-Efficient Flash Translation Layer for CompactFlash Systems, May 2002, 10 pgs.
Lu, A Forest-structured Bloom Filter with Flash Memory, MSST 2011, Denver, CO, May 23-27, 2011, article, 6 pgs.
Lu, A Forest-structured Bloom Filter with Flash Memory, MSST 2011, Denver, CO, May 23-27, 2011, presentation slides, 25 pgs.
McLean, Information Technology-AT Attachment with Packet Interface Extension, Aug. 19, 1998, 339 pgs.
Park, A High Performance Controller for NAND Flash-Based Solid State Disk (NSSD), Feb. 12-16, 2006, 4 pgs.
Pliant Technology, International Search Report / Written Opinion, PCT/US08/88133, Mar. 19, 2009, 7 pgs.
Pliant Technology, International Search Report / Written Opinion, PCT/US08/88136, Mar. 19, 2009, 7 pgs.
Pliant Technology, International Search Report / Written Opinion, PCT/US08/88146, Feb. 26, 2009, 10 pgs.
Pliant Technology, International Search Report / Written Opinion, PCT/US08/88154, Feb. 27, 2009, 8 pgs.
Pliant Technology, International Search Report / Written Opinion, PCT/US08/88164, Feb. 13, 2009, 6 pgs.
Pliant Technology, International Search Report / Written Opinion, PCT/US08/88206, Feb. 18, 2009, 8 pgs.
Pliant Technology, International Search Report / Written Opinion, PCT/US08/88217, Feb. 19, 2009, 7 pgs.
Pliant Technology, International Search Report / Written Opinion, PCT/US08/88229, Feb. 13, 2009, 7 pgs.
Pliant Technology, International Search Report / Written Opinion, PCT/US08/88232, Feb. 19, 2009, 8 pgs.
Pliant Technology, International Search Report / Written Opinion, PCT/US08/88236, Feb. 19, 2009, 7 pgs.
Pliant Technology, International Search Report / Written Opinion, PCT/US2011/028637, Oct 27, 2011, 11 pgs.
Pliant Technology, Supplementary ESR, 08866997.3, Feb. 23, 2012, 6 pgs.
SanDisk Enterprise IP LLC, International Search Report / Written Opinion, PCT/US2012/042764, Aug. 31, 2012, 12 pgs.
SanDisk Enterprise IP LLC, International Search Report / Written Opinion, PCT/US2012/042771, Mar. 4, 2013, 14 pgs.
SanDisk Enterprise IP LLC, International Search Report / Written Opinion, PCT/US2012/042775, Sep. 26, 2012, 8 pgs.
SanDisk Enterprise IP LLC, International Search Report / Written Opinion, PCT/US2012/059447, Jun. 6, 2013, 12 pgs.
SanDisk Enterprise IP LLC, International Search Report / Written Opinion, PCT/US2012/059453, Jun. 6, 2013, 12 pgs.
Sandisk Enterprise IP LLC, International Search Report / Written Opinion, PCT/US2012/059459, Feb. 14, 2013, 9 pgs.
SanDisk Enterprise IP LLC, International Search Report / Written Opinion, PCT/US2012/065914, May 23, 2013, 7 pgs.
SanDisk Enterprise IP LLC, International Search Report / Written Opinion, PCT/US2012/065916, Apr. 5, 2013, 7 pgs.
SanDisk Enterprise IP LLC, International Search Report / Written Opinion, PCT/US2012/065919, Jun. 17, 2013, 8 pgs.
SanDisk Enterprise IP LLC, Notification of the Decision to Grant a Patent Right for Patent for Invention, CN 200880127623.8, Jul. 4, 2013, 1 pg.
SanDisk Enterprise IP LLC, Office Action, CN 200880127623.8, Apr. 18, 2012, 12 pgs.
SanDisk Enterprise IP LLC, Office Action, CN 200880127623.8, Dec. 31, 2012, 9 pgs.

(56) References Cited

OTHER PUBLICATIONS

SanDisk Enterprise IP LLC, Office Action, JP 2010-540863, Jul. 24, 2012, 3 pgs.
Watchdog Timer and Power Savin Modes, Microchip Technology Inc., 2005, 14 pgs.
Zeidman, 1999 Verilog Designer's Library, 9 pgs.
International Search Report and Written Opinion dated Jul. 14, 2015, received in International Patent Application No. PCT/US2015/027263, which corresponds to U.S. Appl. No. 14/599,128, 10 pages (Ellis).

* cited by examiner

US 9,250,676 B2

POWER FAILURE ARCHITECTURE AND VERIFICATION

RELATED APPLICATIONS

This application claims priority to U.S. Provisional Patent Application No. 61/910,163, filed Nov. 29, 2013, which is hereby incorporated by reference in its entirety.

TECHNICAL FIELD

The disclosed embodiments relate generally to memory systems, and in particular, to power sequencing and data hardening circuitry architecture in storage devices.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information. However, it is important to protect data integrity during power disruption events.

SUMMARY

Data hardening, the saving of data and mission critical metadata held in volatile storage, is an integral part of the storage devices disclosed in this document. As discussed more fully elsewhere in this document, when there is a power failure, mission critical data may reside in volatile memory in a number of sub-system components. Coordinating and managing multiple sub-system components to ensure that volatile data is saved successfully is important for safeguarding data integrity in a storage device.

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to enable power sequencing and data hardening in storage devices. In one aspect, a soft power fail operation is performed in response to a signal received or detected by a storage device.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1:
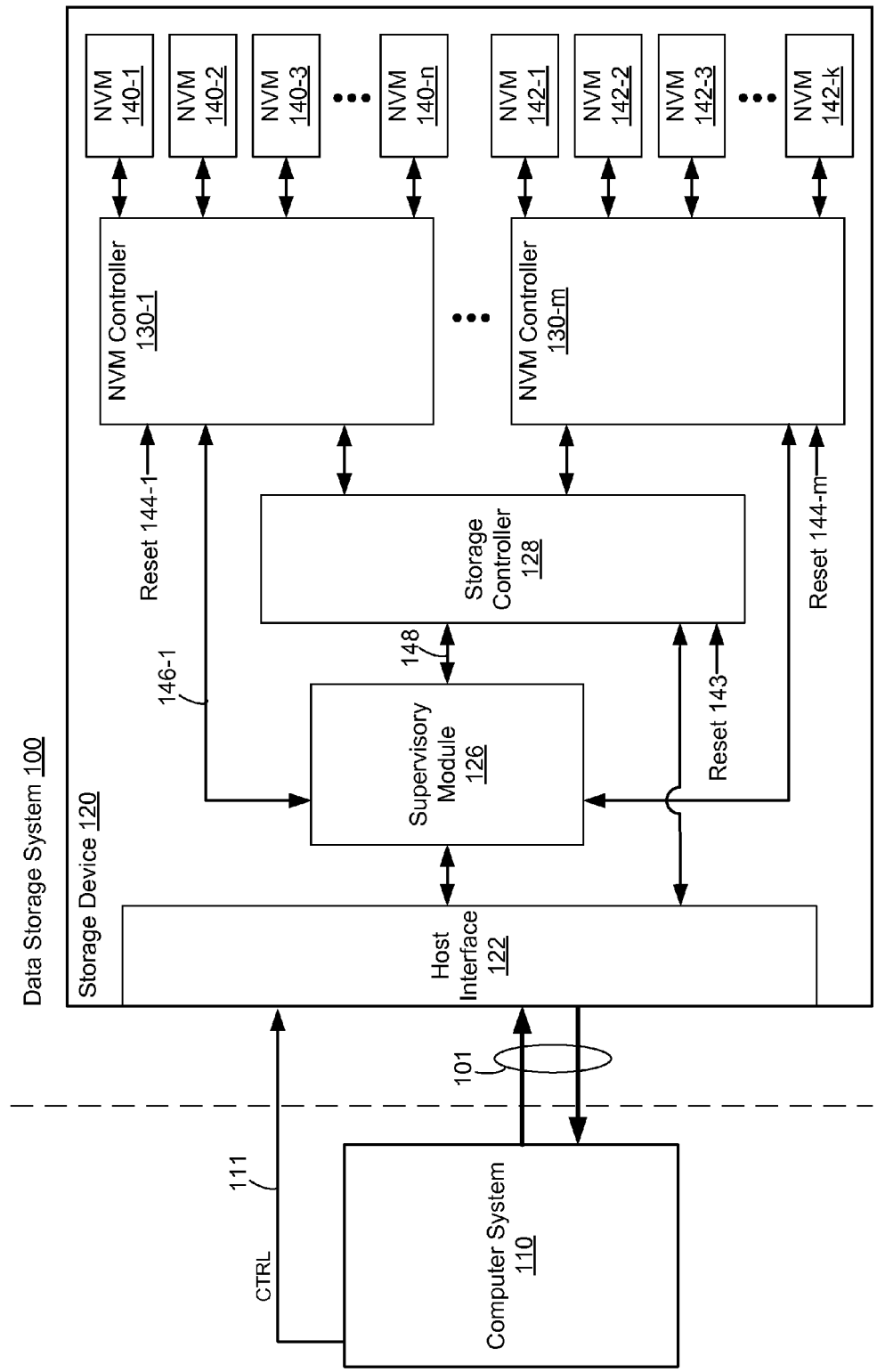
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to enable power sequencing and data hardening in storage devices. Some implementations include systems, methods and/or devices to perform a soft power fail operation.

More specifically, some implementations include a method of protecting data in a storage device comprising volatile memory and non-volatile memory. In some implementations, the method includes, performing a soft power fail operation on a first section of the storage device, the soft power fail operation including: (1) signaling a power test condition to a first controller on the storage device; (2) providing one or more controllers with power from an energy storage device, where the energy storage device is distinct from a power supply used during normal operation of the storage device; (3) signaling a power fail condition to the one or more controllers on the storage device, where the one or more controllers communicate with the first controller and correspond to the first section of the storage device, and where, in response to the power fail condition, each of the one or more controllers performs a data hardening operation; and (4) resuming normal operation on the first section of the storage device.

In some embodiments, providing the one or more controllers with power from the energy storage device and signaling the power fail condition to the one or more controllers on the storage device are done simultaneously.

In some embodiments, performing the data hardening operation includes generating a hardening done signal.

In some embodiments, the method further comprises resuming normal operation on the first section of the storage device in response to receiving a respective hardening done signal from at least one of the one or more controllers.

In some embodiments, performing the data hardening operation includes transferring data held in the volatile memory of the storage device to the non-volatile memory of the storage device.

In some embodiments, transferring data held in the volatile memory of the storage device to the non-volatile memory of the storage device includes utilizing one or more preset pages in the non-volatile memory.

In some embodiments, the method further comprises, prior to performing the soft power fail operation on the first section of the storage device, initializing the one or more preset pages.

In some embodiments, during the soft power fail operation, the one or more controllers operate at higher speeds than during normal operation.

In some embodiments, during the soft power fail operation, the one or more controllers write to more non-volatile memory devices in parallel than during normal operation.

In some embodiments, during the soft power fail operation, the one or more controllers draw more power than during normal operation.

In some embodiments, performing the data hardening operation includes resetting the one or more controllers.

In some embodiments, performing the data hardening operation includes removing power from the one or more controllers.

In some embodiments, performing the soft power fail operation includes recording time elapsed between signaling the power fail condition to a respective controller and receiving the corresponding hardening done signal from the respective controller.

In some embodiments, the method further comprises, in accordance with a determination that the time elapsed exceeds a predetermined threshold, performing a power fail error operation.

In some embodiments, the method further comprises recording data regarding the soft power fail operation to non-volatile memory.

In some embodiments, the method further comprises performing the soft power fail operation on the first section of the storage device in response to detecting an error condition.

In some embodiments, the method further comprises performing the soft power fail operation on the first section of the storage device in response to a received command (also sometimes called a protocol message).

In some embodiments, the energy storage device comprises one or more capacitors.

In some embodiments, the method further comprises, prior to performing the soft power fail operation on the first section of the storage device: (1) charging the energy storage device; (2) determining whether the energy storage device meets a minimum charge level threshold within a predefined charge time; and (3) in accordance with a determination that the energy storage device does not meet the minimum charge level threshold in the predefined charge time, performing a power fail error operation.

In some embodiments, performing the soft power fail operation on the first section of the storage device includes bringing the energy storage device to a discharged state; and the method further comprises resuming normal operation on the first section of the storage device subsequent to the storage device reaching the discharged state.

In some embodiments, resuming normal operation on the first section of the storage device includes bringing the energy storage device to a charged state.

In some embodiments, resuming normal operation on the first section of the storage device includes providing the one or more controllers with the power supply used during normal operation of the storage device.

In some embodiments, the soft power fail operation is controlled by a power control processor (PCP) of the storage device.

In some embodiments, the first controller on the storage device is a memory controller; and where, in response to the power test signal, the first controller asserts a hardening done signal and ignores power fail errors received from the one or more controllers.

In another aspect, any of the methods described above are performed by a storage device including (1) an interface for coupling the storage device to a host system, (2) a plurality of controllers and (3) supervisory module including one or more processors and an energy storage device, the supervisory module configured to perform a soft power fail operation on a first section of the storage device, the soft power fail operation including: (a) signaling a power test condition to a first controller on the storage device; (b) providing one or more controllers with power from an energy storage device, where the energy storage device is distinct from a power supply used during normal operation of the storage device; (c) signaling a power fail condition to the one or more controllers on the storage device, where the one or more controllers communicate with the first controller and correspond to the first section of the storage device, and where, in response to the power fail condition, each of the one or more controllers performs a data hardening operation; and (d) resuming normal operation on the first section of the storage device.

In some embodiments, the storage device is configured to operate in accordance with any of the methods described above.

In yet another aspect, any of the methods described above are performed by a storage device including: (1) memory, (2) one or more processors coupled to the memory, and (3) one or more programs, stored in the memory and executed by the one or more processors, the one or more programs including instructions for performing any of the methods described above.

In yet another aspect, any of the methods described above are performed by a storage device operable to protect data. In some embodiments, the device includes: (1) an interface for coupling the storage device to a host system, (2) means for performing a soft power fail operation on a first section of the storage device, the soft power fail operation including: (a) means for signaling a power test condition to a first controller on the storage device; (b) means for providing one or more controllers with power from an energy storage device, where the energy storage device is distinct from a power supply used during normal operation of the storage device; (c) means for signaling a power fail condition to the one or more controllers on the storage device, where the one or more controllers communicate with the first controller and correspond to the first section of the storage device, and where, in response to the power fail condition, each of the one or more controllers performs a data hardening operation; and (d) means for resuming normal operation on the first section of the storage device.

In yet another aspect, a non-transitory computer readable storage medium, storing one or more programs for execution by one or more processors of a storage device having a plurality of controllers and supervisory module, the one or more programs including instructions for performing any of the methods described above.

In some embodiments, the non-transitory computer readable storage medium includes a non-transitory computer readable storage medium associated with each of the plurality of controllers on the storage device and a non-transitory computer readable storage medium associated with the supervisory module.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a block diagram illustrating an implementation of a data storage system 100, in accordance with some embodiments. While some example features are illustrated, various other features have not been illustrated for the sake of brevity and so as not to obscure more pertinent aspects of the example implementations disclosed herein. To that end, as a non-limiting example, data storage system 100 includes storage device 120 (also sometimes called an information storage device, or a data storage device, or a memory device), which includes host interface 122, supervisory module 126, storage controller 128, one or more non-volatile memory (NVM) controllers 130 such as flash controllers, and non-volatile memory (e.g., one or more NVM device(s) 140, 142 such as one or more flash memory devices), and is used in conjunction with computer system 110. In some implementations, storage device 120 includes a single NVM device while in other implementations storage device 120 includes a plurality of NVM devices. In some implementations, NVM devices 140, 142 include NAND-type flash memory or NOR-type flash memory. Further, in some implementations, NVM controller 130 is a solid-state drive (SSD) controller. However, one or more other types of storage media may be included in accordance with aspects of a wide variety of implementations.

Computer system 110 is coupled to storage device 120 through data connections 101. However, in some implementations computer system 110 includes storage device 120 as a component and/or sub-system. Computer system 110 may be any suitable computer device, such as a personal computer, a workstation, a computer server, or any other computing device. Computer system 110 is sometimes called a host or host system. In some implementations, computer system 110 includes one or more processors, one or more types of memory, optionally includes a display and/or other user interface components such as a keyboard, a touch screen display, a mouse, a track-pad, a digital camera and/or any number of supplemental devices to add functionality. Further, in some implementations, computer system 110 sends one or more host commands (e.g., read commands and/or write commands) on control line 111 to storage device 120. In some implementations, computer system 110 is a server system, such as a server system in a data center, and does not have a display and other user interface components.

In some implementations, storage device 120 includes NVM devices 140, 142 such as flash memory devices (e.g., NVM devices 140-1 through 140-$n$ and NVM devices 142-1 through 142-$k$) and NVM controllers 130 (e.g., NVM controllers 130-1 through 130-$m$). In some implementations, each NVM controller of NVM controllers 130 include one or more processing units (also sometimes called CPUs or processors or microprocessors or microcontrollers) configured to execute instructions in one or more programs (e.g., in NVM controllers 130). In some implementations, the one or more processors are shared by one or more components within, and in some cases, beyond the function of NVM controllers 130. In some implementations, NVM controllers 130 are configured to receive (e.g., via reset module 612, FIG. 6) reset 144 from various components of storage device 120 (e.g., from supervisory module 126 and/or from storage controller 128). In some implementations, reset 144-1 and reset 144-$m$ are the same signal.

NVM devices 140, 142 are coupled to NVM controllers 130 through connections that typically convey commands in addition to data, and optionally convey metadata, error correction information and/or other information in addition to data values to be stored in NVM devices 140, 142 and data values read from NVM devices 140, 142. For example, NVM devices 140, 142 can be configured for enterprise storage suitable for applications such as cloud computing, or for caching data stored (or to be stored) in secondary storage, such as hard disk drives. Additionally and/or alternatively, flash memory (e.g., NVM devices 140, 142) can also be configured for relatively smaller-scale applications such as personal flash drives or hard-disk replacements for personal, laptop and tablet computers. Although flash memory devices and flash controllers are used as an example here, in some embodiments storage device 120 includes other non-volatile memory device(s) and corresponding non-volatile memory controller(s).

In some implementations, storage device 120 also includes host interface 122, supervisory module 126, and storage controller 128. Storage device 120 may include various additional features that have not been illustrated for the sake of brevity and so as not to obscure more pertinent features of the example implementations disclosed herein, and a different arrangement of features may be possible. Host interface 122 provides an interface to computer system 110 through data connections 101.

In some implementations, supervisory module 126 (also sometimes called data hardening module) includes one or more processing units (also sometimes called CPUs or processors or microprocessors or microcontrollers) configured to execute instructions in one or more programs (e.g., in supervisory module 126). In some implementations, the one or more processors are shared by one or more components within, and in some cases, beyond the function of supervisory 126. Supervisory module 126 is coupled to host interface 122, storage controller 128, and NVM controllers 130 in order to coordinate the operation of these components, including supervising and controlling functions such as power up, power down, data hardening, charging energy storage device(s), data logging, and other aspects of managing functions on storage device 120.

Storage controller 128 is coupled to host interface 122, supervisory module 126, and NVM controllers 130. In some implementations, during a write operation, storage controller 128 receives data from computer system 110 through host interface 122 and during a read operation, storage controller 128 sends data to computer system 110 through host interface 122. Further, host interface 122 provides additional data, signals, voltages, and/or other information needed for communication between storage controller 128 and computer system 110. In some embodiments, storage controller 128 and host interface 122 use a defined interface standard for communication, such as double data rate type three synchronous dynamic random access memory (DDR3). In some embodiments, storage controller 128 and NVM controllers 130 use a defined interface standard for communication, such as serial advance technology attachment (SATA). In some other implementations, the device interface used by storage controller 128 to communicate with NVM controllers 130 is SAS (serial attached SCSI), or other storage interface. In some implementations, storage controller 128 is configured to receive (e.g., via reset module 512, FIG. 5) reset 143 from various components of storage device 120 (e.g., from supervisory module 126 and/or from host interface 122). In some implementations, reset 143, reset 144-1, and reset 144-$m$ are the same signal. In some implementations, reset 143, reset 144-1, and reset 144-$m$ are independent signals. In some implementations, reset 143, reset 144-1, and reset 144-$m$ are transmitted via the same communication bus. In some implementations, reset 143, reset 144-1, and reset 144-$m$ are controlled separately. In some implementations, storage controller 128 includes one or more processing units (also sometimes called CPUs or processors or microprocessors or microcontrollers) configured to execute instructions in one or more programs (e.g., in storage controller 128). In some implementations, the one or more processors are shared by one or more components within, and in some cases, beyond the function of storage controller 128.

Figure 2:
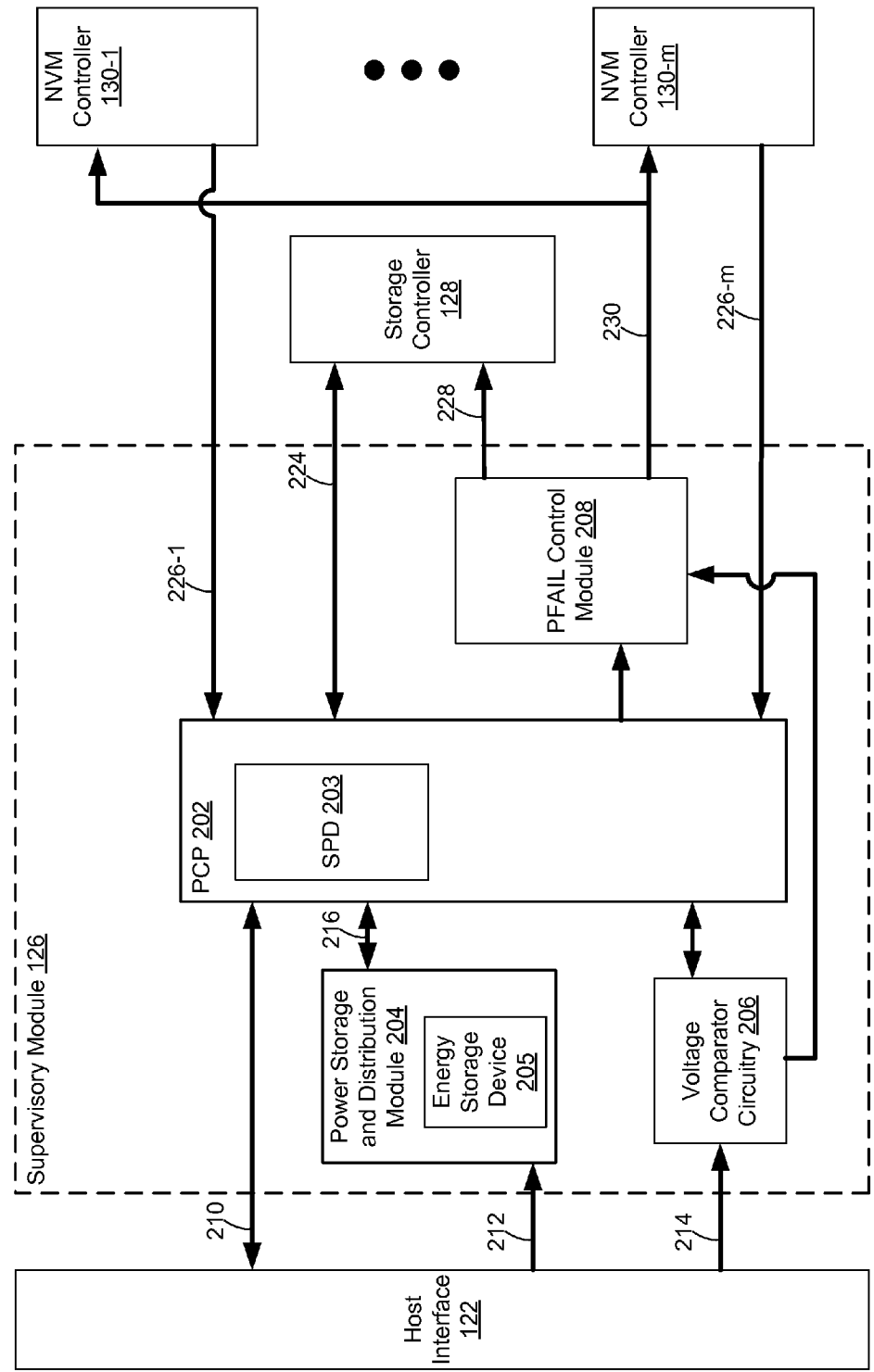
FIG. 2 is a block diagram illustrating an implementation of supervisory module, in accordance with some embodiments.

FIG. 2 is a block diagram illustrating an implementation of supervisory module 126, in accordance with some embodiments. Supervisory module 126 is coupled to host interface 122 via a communication bus 210, voltage input 212 (e.g., $V_{dd}$ 402, FIG. 4) and voltage input 214. In some implementations, voltage input 212 is a part of a communication bus. In some implementations, voltage input 212 is the same as voltage input 214, while in other implementations voltage input 212 is different from voltage input 214. In some implementations, communication bus 210 includes a voltage source (e.g., $V_{SPD}$ 404, FIG. 4) supplied through host interface 122.

Communication buses (e.g., communication bus 210, FIG. 2) optionally include circuitry (sometimes called a chipset) that interconnects and controls communications between system components. Supervisory module 126 is coupled to host interface 122, storage controller 128, and NVM controllers 130 (e.g., NVM controllers 130-1 through 130-$m$) via communication buses (e.g., communication bus 148, FIG. 1).

Supervisory module 126 includes power control processor (PCP) 202 (including SPD 203) for executing modules, programs and/or instructions stored therein. In some implementations, PCP 202 is coupled to NVM controllers 130 (e.g., NVM controllers 130-1 through 130-$m$) via PFAIL lines 226. In some implementations, PFAIL lines 226 are part of a communication bus. In some implementations, PFAIL lines 226 are tri-state lines that are driven by PCP 202, NVM controllers 130, or neither, depending on the operations of supervisory module 126. PCP 202 is coupled to storage controller 128 via communication bus 224. In some implementations, communication bus 224 includes a power test command and/or signal to notify storage controller 128 of pending power fail operations affecting one or more NVM controllers 130.

Supervisory module 126 also includes power storage and distribution module 204 (including energy storage device 205), power failure (PFAIL) control module 208, voltage comparator circuitry 206, and a plurality of communication buses (e.g., communication buses 210, 216, 222, and 224). In some implementations, power storage and distribution module 204 includes circuitry for monitoring, storing, and distributing power for a storage device (e.g., storage device 120, FIG. 1), including monitoring, controlling, charging, and/or testing energy storage device 205. In some embodiments, energy storage device 205 includes one or more capacitors. In other embodiments, energy storage device 205 includes one or more inductors or any other passive elements that store energy. In some implementations, energy storage device 205 is charged by boosting voltage input 212.

Voltage comparator circuitry 206 is coupled to PCP 202 and PFAIL control module 208. In some implementations, voltage comparator circuitry 206 includes circuitry for monitoring voltage input 214, detecting undervoltage and overvoltage conditions, and signaling power failure conditions to various components (e.g., PFAIL control module 208) of supervisory module 126. While voltage comparator circuitry 206 is shown in FIG. 2 as being external to PCP 202, in some implementations voltage comparator circuitry 206 or portions of voltage comparator circuitry 206 are embedded in PCP 202. Alternatively, in some implementations, PCP 202 includes analog to digital conversion (ADC) circuitry, for converting voltage input 214 to a digital value, and comparison circuitry or software for detecting undervoltage and overvoltage conditions.

PFAIL control module 208 is coupled to PCP 202, voltage comparator circuitry 206, storage controller 128, and NVM controllers 130 (e.g., NVM controllers 130-1 through 130-$m$). In some implementations, PFAIL control module 208 includes circuitry to detect power fail conditions, signal power failures to storage controller 128 via PFAIL line 228, and signal power failures to NVM controllers (e.g., NVM controllers 130-1 through 130-$m$) via PFAIL lines 230. In some implementations, PFAIL lines 230 are part of a communication bus between PFAIL control module 208 and NVM controllers 130.

SPD device 203 is coupled to host interface 122. In some embodiments, SPD 203 is a part of (e.g., integrated into) PCP 202, while in some other embodiments SPD 203 is separate and distinct from PCP 202. Serial presence detect (SPD) refers to a standardized way to automatically access information about a computer memory module (e.g., storage device 120). For example, information about the type of the device (e.g., where the device type is one of a predefined set of device types), and the storage capacity of the device can be communicated with a host system (e.g., computer system 110) through SPD device 203. In another example, if the memory module has a failure, the failure can be communicated with a host system (e.g., computer system 110) through SPD device 203.

Figure 3:
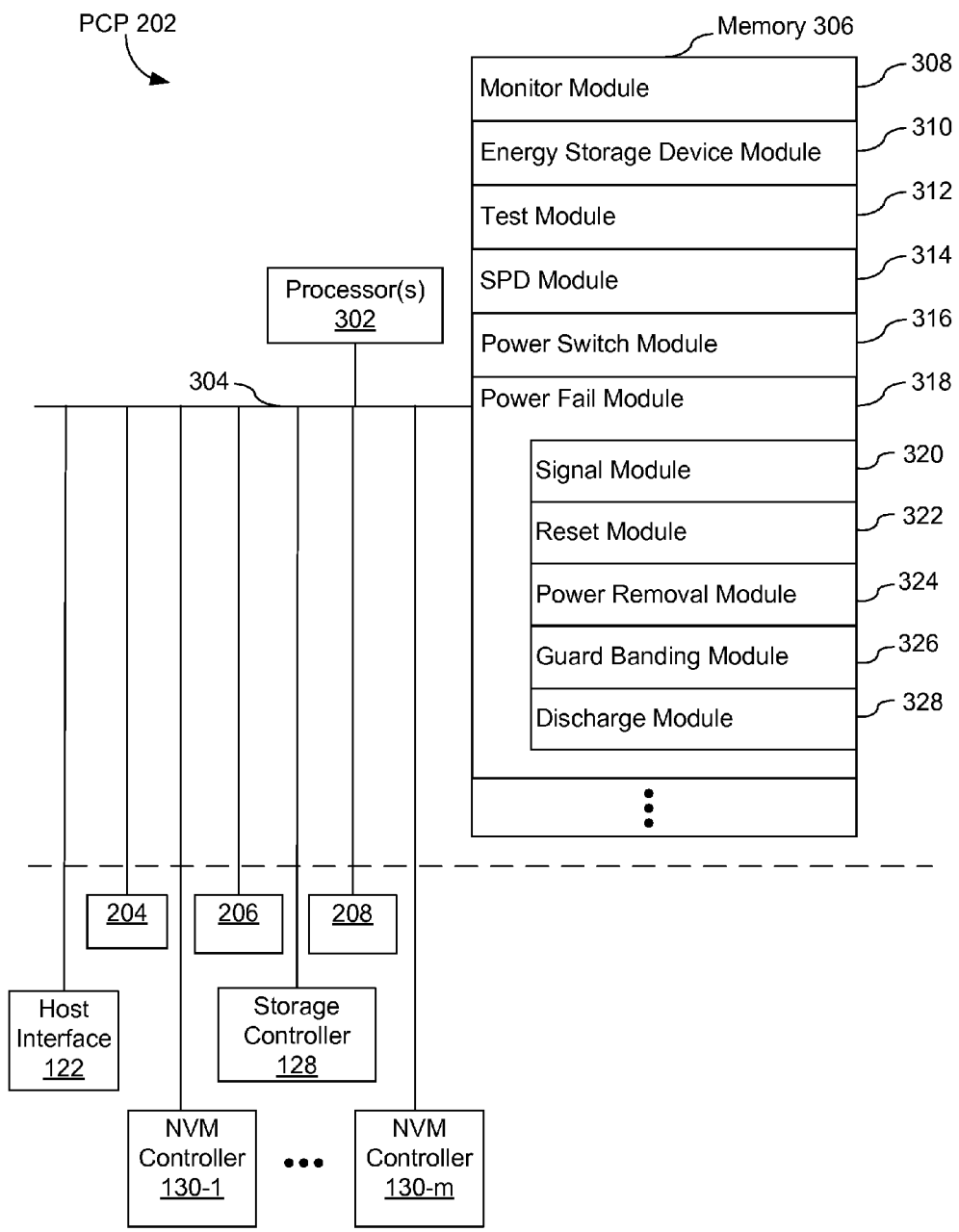
FIG. 3 is a block diagram illustrating an implementation of a power control processor, in accordance with some embodiments.

FIG. 3 is a block diagram illustrating an implementation of PCP 202, in accordance with some embodiments. PCP 202 includes one or more processors (also sometimes called CPUs or processing units or microprocessors or microcontrollers) 302 for executing modules, programs and/or instructions stored in memory 306 and thereby performing processing operations, memory 306, and one or more communication buses 304 for interconnecting these components. Communication buses 304 optionally include circuitry (sometimes called a chipset) that interconnects and controls communications between system components. PCP 202 is coupled to host interface 122, storage controller 128, NVM controllers 130 (e.g., NVM controllers 130-1 through 130-$m$), power storage and distribution module 204, voltage comparator circuitry 206, and PFAIL control module 208 by communication buses 308. Memory 306 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 306 optionally includes one or more storage devices remotely located from processor(s) 302. Memory 306, or alternately the non-volatile memory device(s) within memory 306, comprises a non-transitory computer readable storage medium. In some embodiments, memory 306, or the computer readable storage medium of memory 306 stores the following programs, modules, and data structures, or a subset thereof:

- a monitor module 308 that is used for monitoring signals provided to a storage device (e.g., storage device 120, FIG. 1), for example to monitor and determine whether a power supply voltage provided to the storage device is lower than an under-voltage threshold;
- an energy storage device module 310 that is used for monitoring, controlling, charging, and/or testing an energy storage device (e.g., energy storage device 205) on the storage device;
- a test module 312 that is used for testing one or more functions of the storage device;
- an SPD module 314 for accessing information about a computer memory module and/or communicating with a host system;
- a power switch module 316 that is used for determining and controlling the voltage that is used to supply power to the storage device; and
- a power fail module 318 that is used for performing a power fail operation or a soft power fail operation in response to certain criterion or signals.

In some embodiments, memory 306, or the computer readable storage medium of memory 306 further stores a configuration module for configuring storage device 120 and supervisory module 126, and/or configuration values (such as one or more under-voltage threshold values) for configuring supervisory module 126, neither of which is explicitly shown in FIG. 3. In some implementations, upon power up and upon reset, the configuration module automatically sets the values of one or more configuration parameters of storage device 120 (and, optionally, determines which of two or more power fail modules, test modules, etc. to use) in accordance with the components of storage device 120 (e.g., the type of non-volatile memory components in storage device 120) and/or characteristics of the data storage system 100 that includes storage device 120.

In some embodiments, the power fail module 318 optionally includes the following modules or sub-modules, or a subset thereof:

- a signal module 320 that is used for signaling a power fail condition to a plurality of controllers on the storage device (e.g., storage controller 128 and NVM controllers 130, FIG. 1);
- a reset module 322 that is used for resetting the plurality of controllers on the storage device;
- a power removal module 324 that is used for removing power from the plurality of controllers on the storage device;
- a guard banding module 326 that is used for tolerating power fluctuations in a power supply voltage provided to the storage device; and
- a discharge module 328 that is used for discharging an energy storage device (e.g., energy storage device 205, FIG. 2) on the storage device.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 306 may store a subset of the modules and data structures identified above. Furthermore, memory 306 may store additional modules and data structures not described above. In some embodiments, the programs, modules, and data structures stored in memory 306, or the computer readable storage medium of memory 306, provide instructions for implementing respective operations in the methods described below with reference to FIGS. 7A-7D.

Although FIG. 3 shows PCP 202, FIG. 3 is intended more as a functional description of the various features which may be present in a PCP than as a structural schematic of the embodiments described herein. In practice, and as recognized by those of ordinary skill in the art, items shown separately could be combined and some items could be separated.

Figure 4:
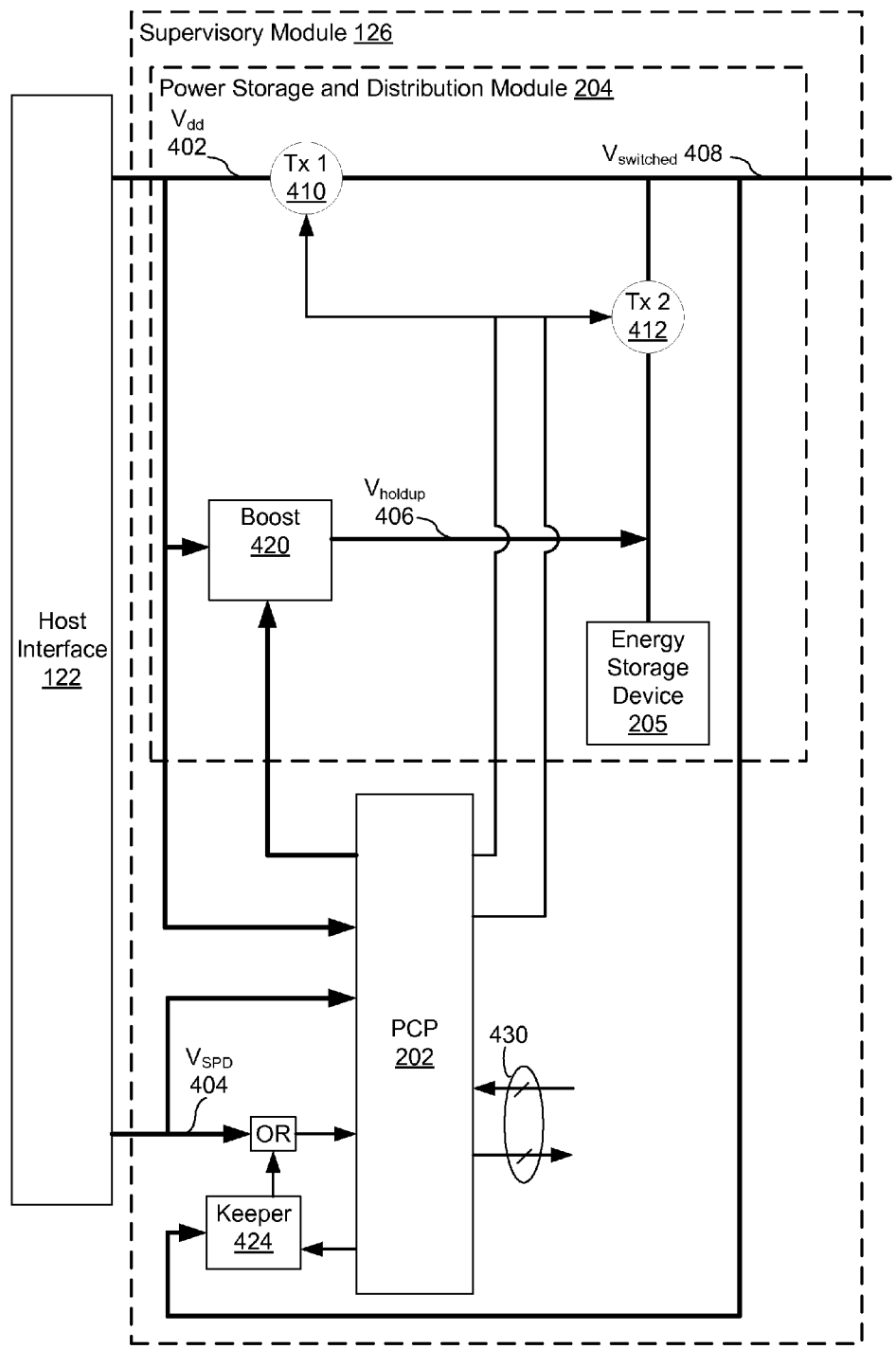
FIG. 4 is a block diagram illustrating an implementation of power storage and distribution module, in accordance with some embodiments.

FIG. 4 is a block diagram illustrating an implementation of power storage and distribution module 204 and supervisory module 126, in accordance with some embodiments. While some example features are illustrated, various other features have not been illustrated for the sake of brevity and so as not to obscure more pertinent aspects of the example implementations disclosed herein. To that end, as a non-limiting example, power storage and distribution module 204 includes boost circuitry 420, energy storage device 205, transistors 410 and 412, and voltages $V_{dd}$ 402, $V_{holdup}$ 406, and $V_{switched}$ 408. In some implementations, $V_{dd}$ 402 is a voltage supplied by a host system (e.g., computer system 110, FIG. 1) and has a target value of 1.5 volts or less. In some implementations, $V_{holdup}$ 406 is a boosted up voltage from $V_{dd}$ 402 and has a target value of 5.7 volts. In some embodiments, $V_{holdup}$ 406 is used to charge energy storage device 205. In some implementations, $V_{SPD}$ 404 is a voltage supplied for serial presence detect (SPD) functionality and has a target value of 3.3 volts. Further, in some implementations, only one of transistors 410 and 412 is enabled at any one time. For example, whenever transistor 412 is enabled, transistor 410 is disabled (open state), so as to ensure that power from energy storage device 205 is not drained to the host system. Furthermore, whenever transistor 410 is enabled, providing power to components of storage device 120 from the host system, transistor 412 is disabled. In some implementations, both transistor 410 and transistor 412 can be disabled at the same time. For example, in some embodiments, removing power from a component of storage device 120 (e.g., storage controller 128 and/or NVM controllers 130) includes disabling both transistor 410 and transistor 412 at the same time. In some implementations, energy storage device 205 comprises a power holdup circuit, implemented using one or more capacitors. In some implementations, energy storage device 205 stores, immediately prior to a power fail condition being detected, at least approximately 30 to 70 millijoules of energy per NVM controller 130 in storage device 120.

In some implementations, PCP 202 monitors and manages the functionality in power storage and distribution module 204. For example, PCP 202 monitors voltages $V_{dd}$ 402 and $V_{SPD}$ 404. In some implementations, if either $V_{dd}$ 402 or $V_{SPD}$ 404 fall below corresponding under-voltage thresholds, PCP 202 signals a power fail condition to a PFAIL control module (e.g., PFAIL control module 208, FIG. 2). In some implementations, PCP 202 signals the power fail condition to a plurality of controllers on storage device 120 (e.g., storage controller 128 and NVM controllers 130, FIG. 1). In some embodiments, the under-voltage threshold varies depending on the target value of the voltage. For example, if the target voltage for $V_{dd}$ 402 is 1.5 volts, the under-voltage threshold may be 1.5 volts minus 5% (i.e., 1.425 volts), so PCP 202 would signal a power fail condition if $V_{dd}$ 402 is lower than 1.425 volts. In some implementations, the under-voltage threshold for $V_{dd}$ 402 is different than the under-voltage threshold for $V_{SPD}$ 404.

In some embodiments, during regular operation of storage device 120, $V_{dd}$ 402 is used to supply power to storage device 120. However, during a power fail operation or a soft power fail operation, energy storage device 205 is used to provide power to storage device 120. In some implementations, PCP 202 controls transistors 410 and 412 to control $V_{switched}$ 408 to be voltage from $V_{dd}$ 402 (e.g., during regular operation) or voltage from energy storage device 205 (e.g., during a power fail operation or a soft power fail operation). For example, during regular operation of storage device 120, $V_{dd}$ 402 is used to supply power to storage device 120, so transistor 410 is turned on (e.g., to complete the connection between $V_{dd}$ 402 and $V_{switched}$ 408) and transistor 412 is turned off (e.g., to disable the connection between energy storage device 205 and $V_{switched}$ 408). However, during a power fail operation or a soft power fail operation, energy storage device 205 is used to provide power to storage device 120, so transistor 410 is turned off (e.g., to disable the connection between $V_{dd}$ 402 and $V_{switched}$ 408) and transistor 412 is turned on (e.g., to enable the connection between energy storage device 205 and $V_{switched}$ 408). In some embodiments, during a power fail operation or a soft power fail operation, $V_{switched}$ 408 is provided to power control systems (also sometimes called power regulators), which convert $V_{switched}$ 408 to the voltages required by various components of storage device 120 (e.g., 0.9 volts, 1.35 volts, 1.5 volts, 1.8 volts, and/or 2.5 volts) and provide those voltages to the appropriate components. Any energy storage device, including one or more capacitors, one or more inductors, or one or more other passive elements that store energy, may be used to store energy to be used during a power fail operation or a soft power fail operation.

In some implementations, energy storage device 205 is charged using $V_{holdup}$ 406, a voltage higher than $V_{dd}$ 402. In some implementations, $V_{dd}$ 402 is boosted up to $V_{holdup}$ 406 using boost circuitry 420 (e.g., 1.35 volts or 1.5 volts is boosted up to 5.7 volts). In some implementations, boost circuitry 420 is controlled and enabled by PCP 202. Further, in some embodiments, $V_{switched}$ 408 is used as an input to keeper circuitry 424, which along with $V_{SPD}$ 404 provides power to PCP 202. During a power fail operation or a soft power fail operation, $V_{switched}$ 408 is provided via keeper circuitry 424 to PCP 202 so as to provide power to PCP 202. In some implementations, PCP 202 has one or more connections 430 used to monitor and control other functions within storage device 120. In some implementations, $V_{SPD}$ 404 provides power to keeper circuitry 424. Furthermore, in some implementations, $V_{SPD}$ 404 is provided to storage device 120 before $V_{dd}$ 402 is provided to storage device 120, allowing devices in storage device 120 to operate before main power $V_{dd}$ 402 is provided to storage device 120.

In some implementations, supervisory module 126 (e.g., PCP 202) uses an algorithm to selectively test one or more capacitors from energy storage device 205 during operation of the storage device. In some implementations, one or more capacitors from energy storage device 205 are tested during regular operation of the storage device (as opposed to during a power fail operation). Since testing the capacitor(s) will discharge the capacitor(s), supervisory module 126 manages the coordination of testing the capacitor(s) to ensure that testing of the capacitor(s) from energy storage device 205 does not interfere with other operations. In some implementations, an energy storage device module (e.g., energy storage device module 310, FIG. 3) is used to selectively test one or more capacitors from the energy storage device during operation of the storage device, as described above with respect to FIG. 3.

In some embodiments, testing energy storage device 205 includes charging the energy storage device using a higher voltage than the power supply voltage provided to the storage device and determining whether energy storage device 205 meets a minimum charge level threshold within a predefined charge time. For example, if the minimum charge level threshold is 95% charge capacity and the predefined charge time is 25 ms, the storage device determines whether the energy storage device is charged to at least 95% charge capacity within 25 ms. In some implementations, an energy storage device module (e.g., energy storage device module 310, FIG. 3) is used to determine whether energy storage device 205 meets a minimum charge level threshold within a predefined charge time, as described above with respect to FIG. 3. Further, in accordance with a determination that energy storage device 205 does not meet the minimum charge level threshold in the predefined charge time, the storage device prevents operation of the storage device. In some implementations, a determination that energy storage device 205 does not meet the minimum charge level threshold in the predefined charge time indicates that there will be a data hardening failure when a power fail operation is performed in the future (e.g., a predictive failure detection). As a result, operation of the storage device is prevented to avoid a future data hardening failure. In some implementations, preventing operation of the storage device includes communicating a failure message to a host system (e.g., computer system 110, FIG. 1). In some implementations, the failure message is communicated with the host system through a SPD device (e.g., SPD device 203, FIG. 2) or a SPD bus controller.

Figure 5:
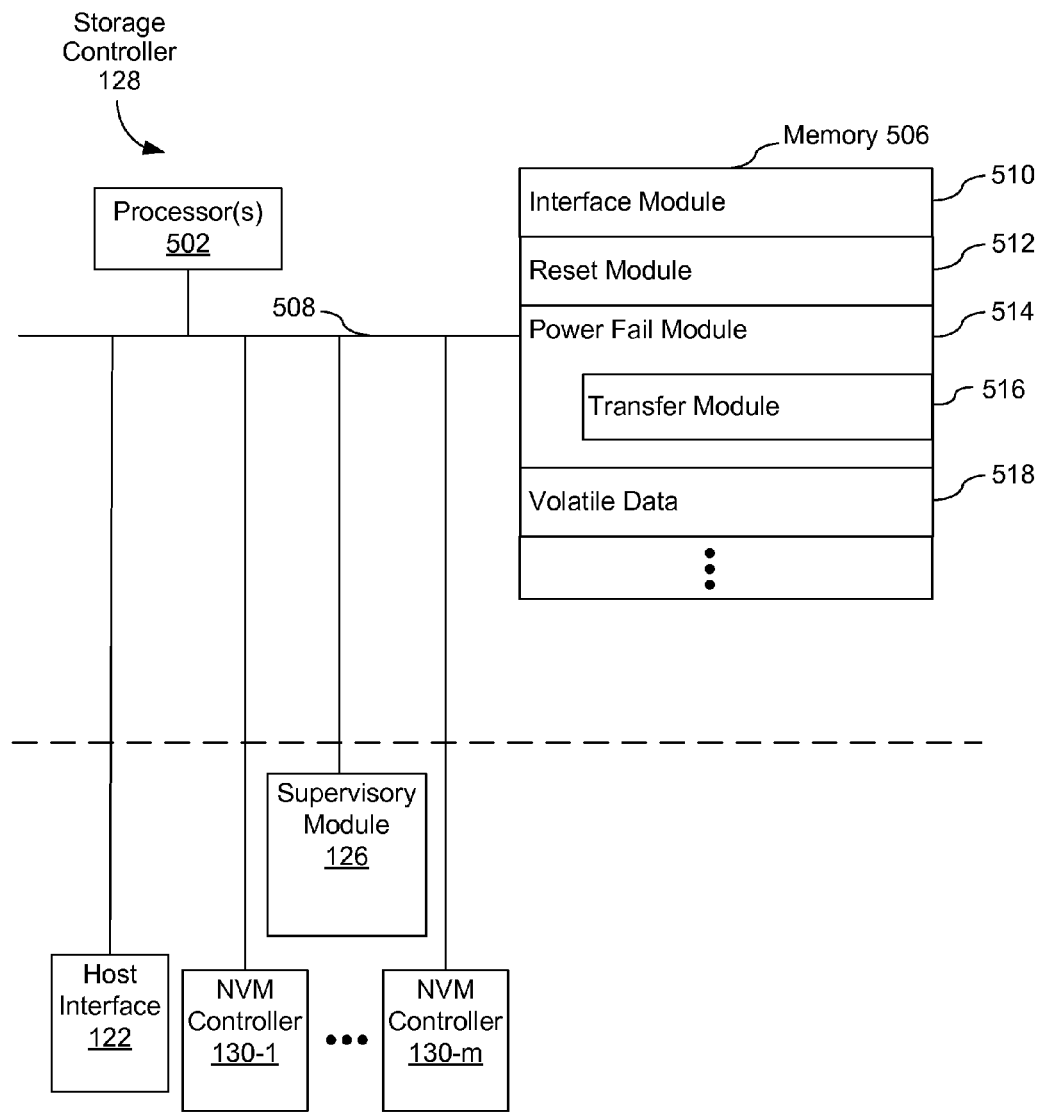
FIG. 5 is a block diagram illustrating an implementation of a memory controller, in accordance with some embodiments.

FIG. 5 is a block diagram illustrating an implementation of a storage controller 128, in accordance with some embodiments. Storage controller 128 typically includes one or more processors (also sometimes called CPUs or processing units or microprocessors or microcontrollers) 502 for executing modules, programs and/or instructions stored in memory 506 and thereby performing processing operations, memory 306, and one or more communication buses 508 for interconnecting these components. Communication buses 508 optionally include circuitry (sometimes called a chipset) that interconnects and controls communications between system components. Storage controller 128 is coupled to host interface 122, supervisory module 126, and NVM controllers 130 (e.g., NVM controllers 130-1 through 130-m) by communication buses 508. Memory 506 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 506 optionally includes one or more storage devices remotely located from processor(s) 502. Memory 506, or alternately the non-volatile memory device(s) within memory 506, comprises a non-transitory computer readable storage medium. In some embodiments, memory 506, or the computer readable storage medium of memory 506 stores the following programs, modules, and data structures, or a subset thereof:

- an interface module 510 that is used for communicating with other components, such as host interface 122, supervisory module 126, and NVM controllers 130;
- a reset module 512 that is used for resetting storage controller 128; and
- a power fail module 514 that is used for performing a power fail operation or a soft power fail operation.

In some embodiments, the power fail module 514 optionally includes a transfer module 516 that is used for transferring data held in volatile memory to non-volatile memory.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 506 may store a subset of the modules and data structures identified above. Furthermore, memory 506 may store additional modules and data structures not described above. In some embodiments, the programs, modules, and data structures stored in memory 506, or the computer readable storage medium of memory 506, provide instructions for implementing respective operations in the methods described below with reference to FIGS. 7A-7D.

Although FIG. 5 shows a storage controller 128, FIG. 5 is intended more as a functional description of the various features which may be present in a memory controller than as a structural schematic of the embodiments described herein. In practice, and as recognized by those of ordinary skill in the art, items shown separately could be combined and some items could be separated.

Figure 6:
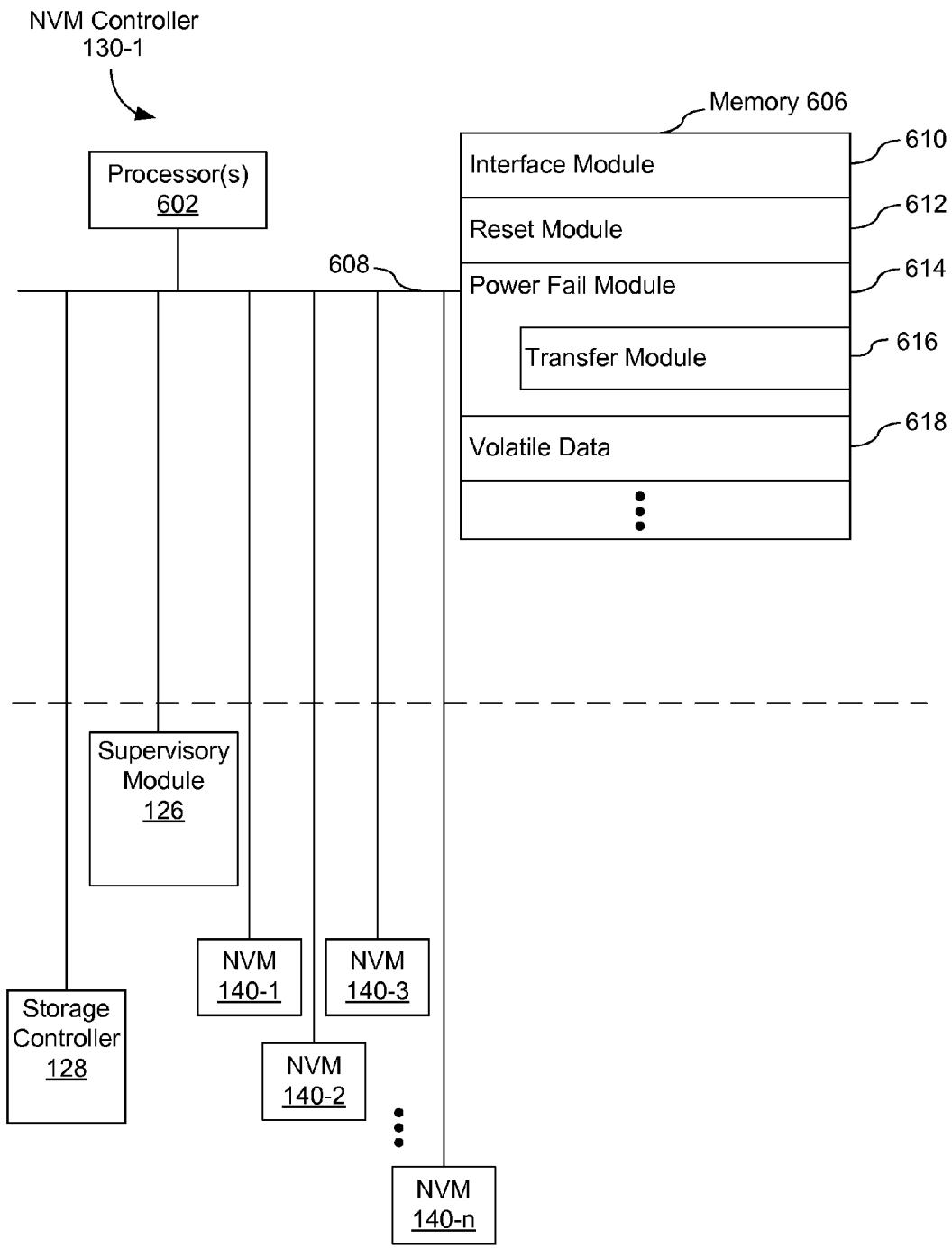
FIG. 6 is a block diagram illustrating an implementation of a NVM controller, in accordance with some embodiments.
Figure 7A:
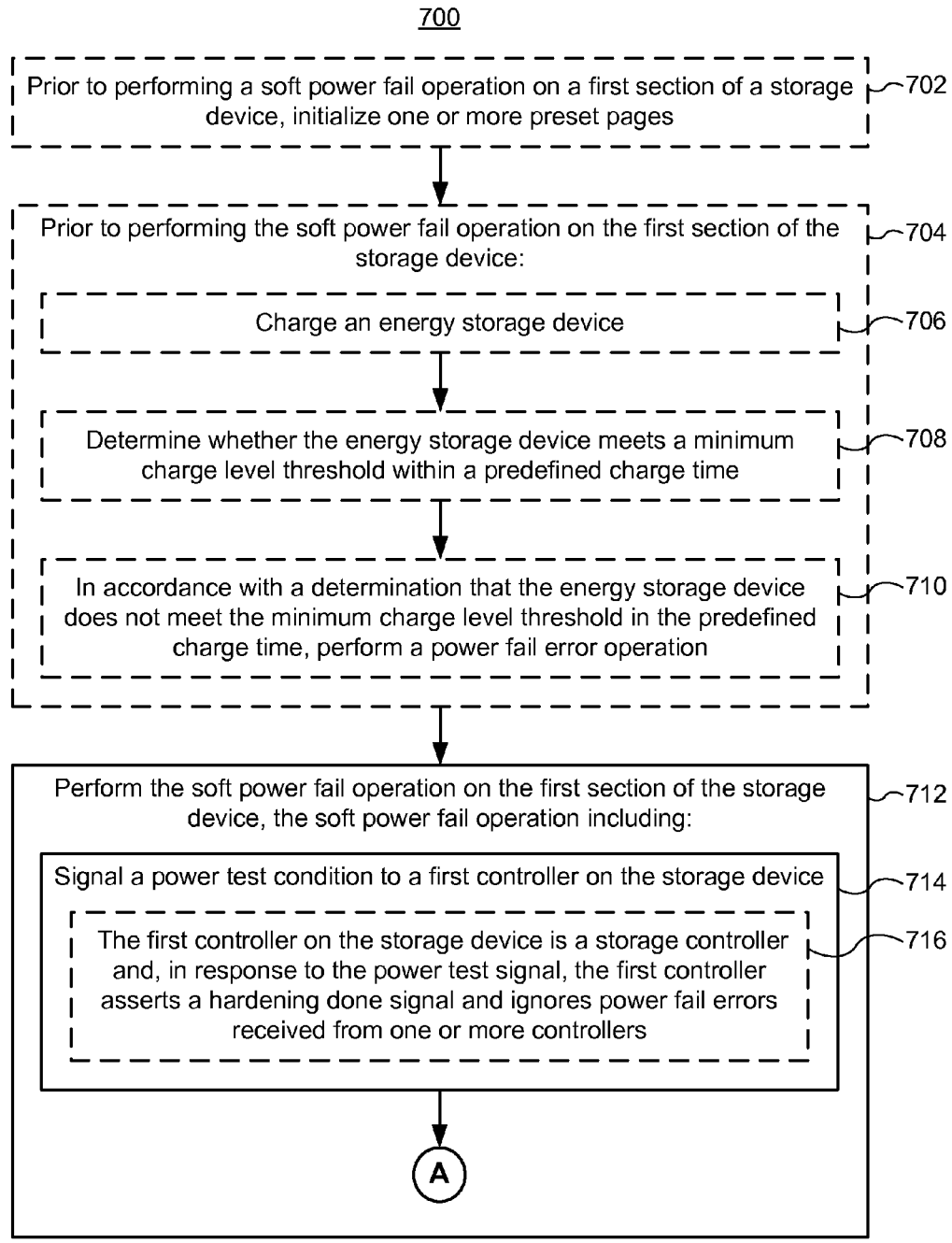
FIGS. 7A-7D illustrate a flowchart representation of a method of protecting data in a storage device, in accordance with some embodiments.
Figure 7B:
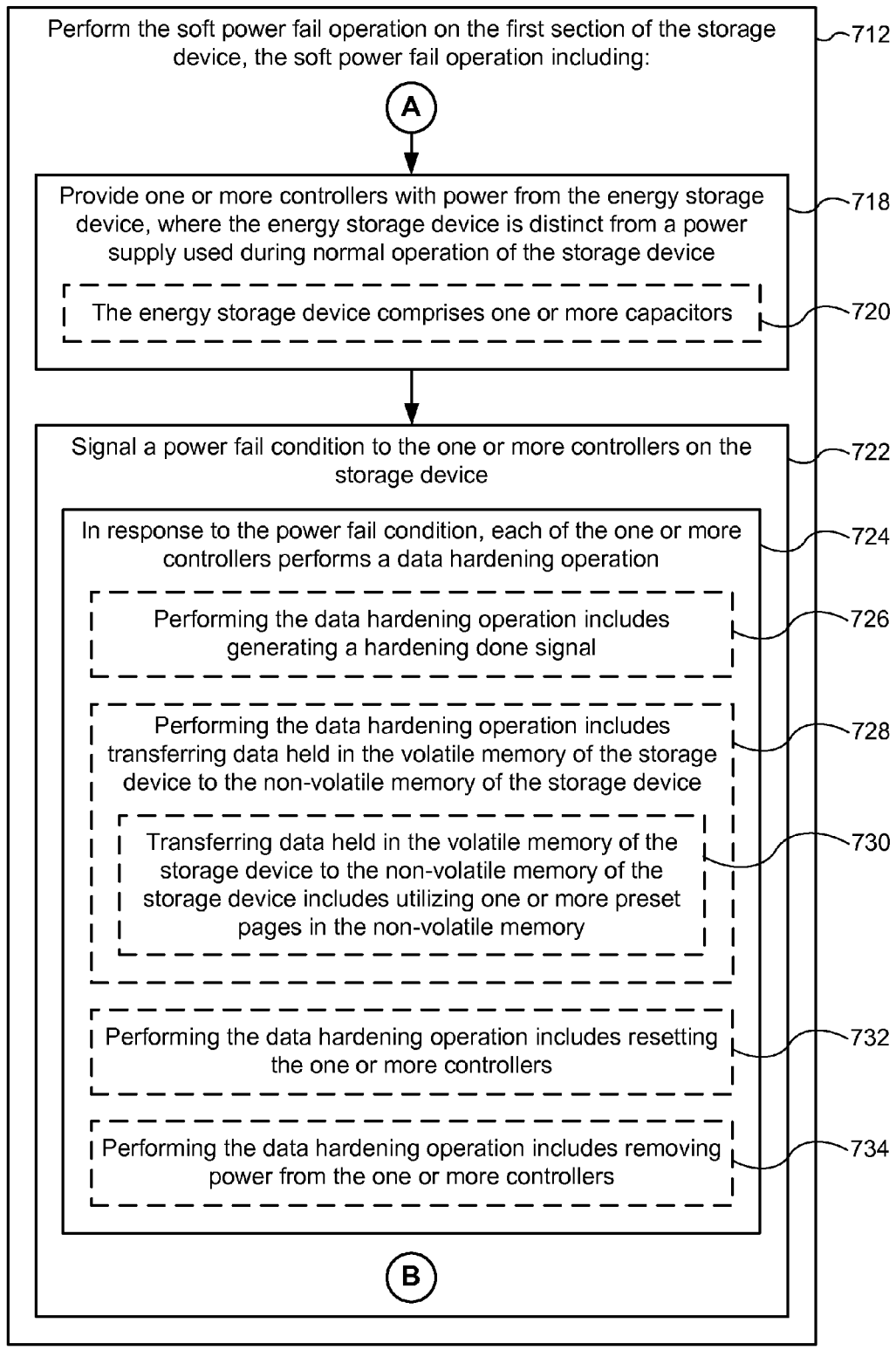
Figure 7C:
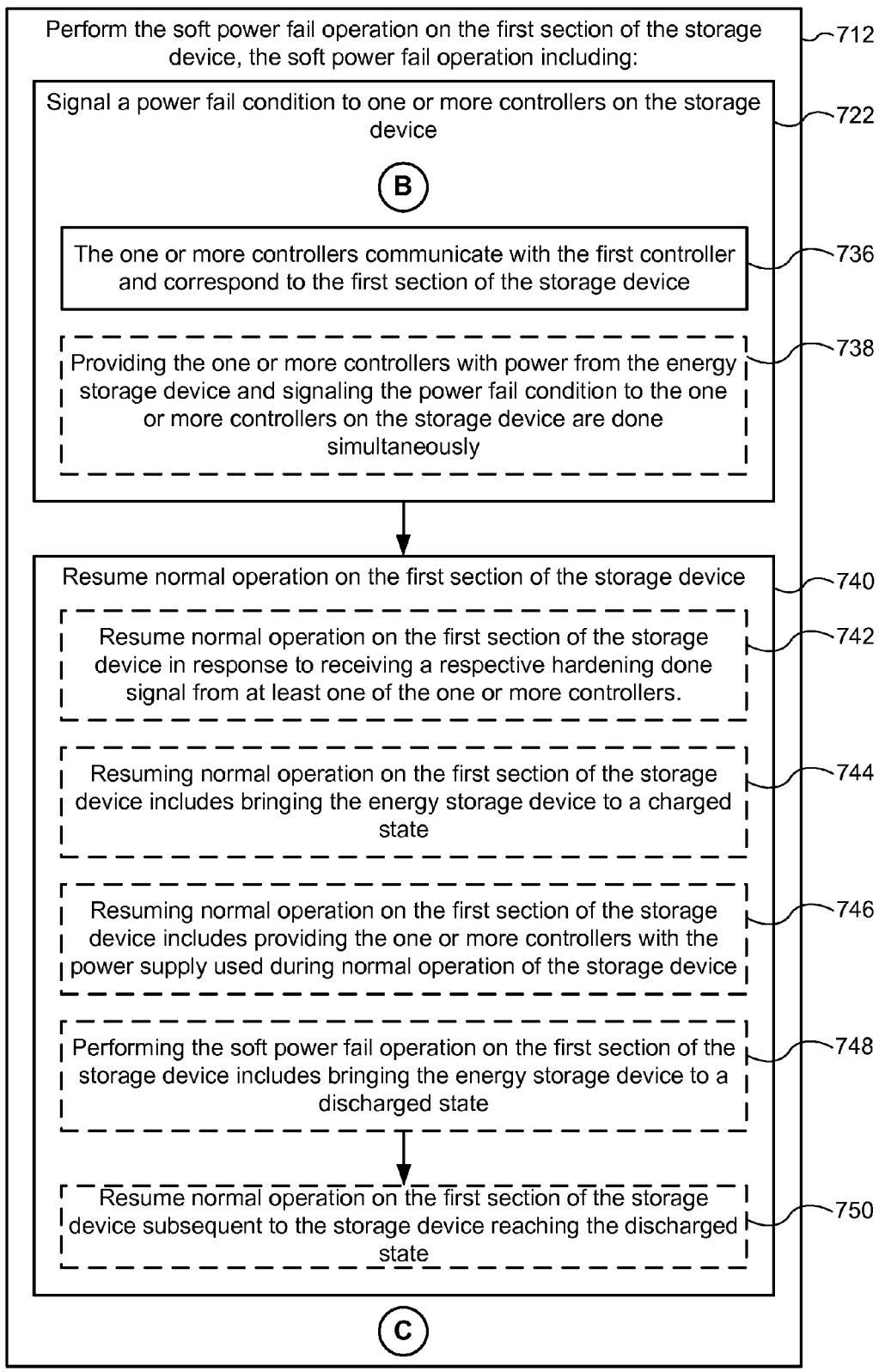
Figure 7D:
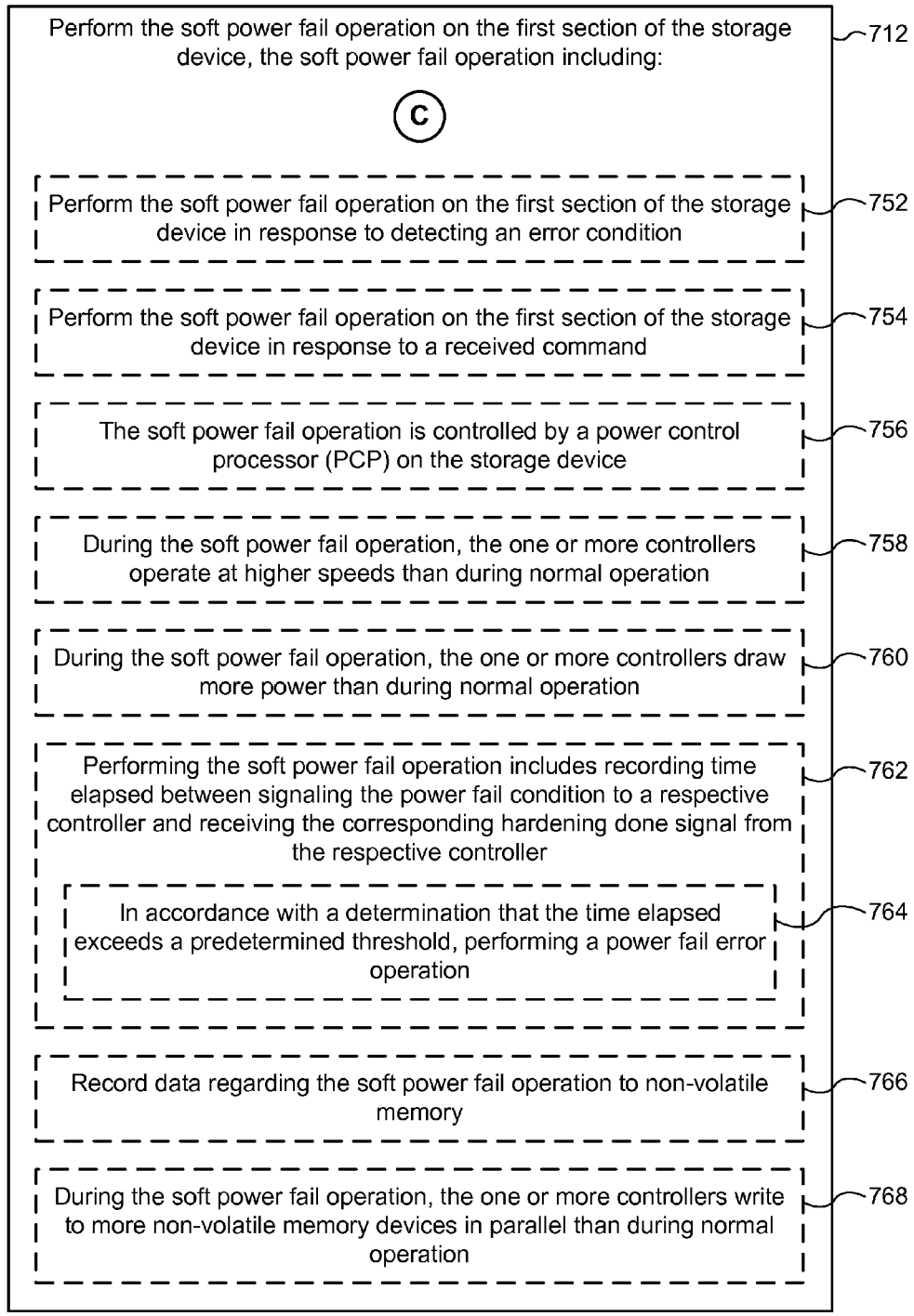

FIG. 6 is a block diagram illustrating an implementation of a NVM controller 130-1, such as a flash controller, in accordance with some embodiments. NVM controller 130-1 typically includes one or more processors (also sometimes called CPUs or processing units or microprocessors or microcontrollers) 602 for executing modules, programs and/or instructions stored in memory 606 and thereby performing processing operations, memory 606, and one or more communication buses 608 for interconnecting these components. Communication buses 608 optionally include circuitry (sometimes called a chipset) that interconnects and controls communications between system components. NVM controller 130-1 is coupled to storage controller 128, supervisory module 126, and NVM devices 140 (e.g., NVM devices 140-1 through 140-n, such as flash memory devices) by communication buses 608. Memory 606 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 606 optionally includes one or more storage devices remotely located from processor(s) 602. Memory 606, or alternately the non-volatile memory device(s) within memory 606, comprises a non-transitory computer readable storage medium. In some embodiments, memory 606, or the computer readable storage medium of memory 606 stores the following programs, modules, and data structures, or a subset thereof:

- an interface module 610 that is used for communicating with other components, such as storage controller 128, supervisory module 126, and NVM devices 140;
- a reset module 612 that is used for resetting NVM controller 130-1; and
- a power fail module 614 that is used for performing a power fail operation or a soft power fail operation.

In some embodiments, the power fail module 614 optionally includes a transfer module 616 that is used for transferring data held in volatile memory to non-volatile memory.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 606 may store a subset of the modules and data structures identified above. Furthermore, memory 606 may store additional modules and data structures not described above. In some embodiments, the programs, modules, and data structures stored in memory 606, or the computer readable storage medium of memory 606, provide instructions for implementing respective operations in the methods described below with reference to FIGS. 7A-7D.

Although FIG. 6 shows a NVM controller 130-1, FIG. 6 is intended more as a functional description of the various features which may be present in a NVM controller than as a structural schematic of the embodiments described herein. In practice, and as recognized by those of ordinary skill in the art, items shown separately could be combined and some items could be separated. Further, although FIG. 6 shows a NVM controller 130-1, the description of FIG. 6 similarly applies to other NVM controllers (e.g., NVM controllers 130-2 through 130-m) in storage device 120 (FIG. 1).

FIGS. 7A-7D illustrate a flowchart representation of a method 700 of protecting data in a storage device, in accordance with some embodiments. In some embodiments, the storage device comprises a dual in-line memory module (DIMM) device. In some implementations, the storage device is compatible with a DIMM memory slot. For example, in some implementations, the storage device is compatible with a 240-pin DIMM memory slot using a DDR3 interface specification. The storage device (e.g., storage device 120, FIG. 1) coordinates and manages multiple sub-system components to protect data, which initiates performance of method 700. At least in some implementations, method 700 is performed by a storage device (e.g., storage device 120, FIG. 1) or one or more components of the storage device (e.g., supervisory module 126, storage controller 128, and/or NVM controllers 130, FIG. 1). In some embodiments, method 700 is governed by instructions that are stored in a non-transitory computer readable storage medium and that are executed by one or more processors of a device, such as the one or more processors 302 of PCP 202, the one or more processors 502 of storage controller 128, and/or the one or more processors 602 of NVM controllers 130, as shown in FIGS. 3, 5, and 6.

In some embodiments, prior to performing the soft power fail operation on the first section of a storage device comprising volatile memory and non-volatile memory (e.g., storage device 120, FIG. 1), the storage device initializes (702) one or more preset pages (also sometimes called preset blocks). For example, in accordance with these embodiments, storage device 120 initializes one or more preset pages in NVM 140 and/or NVM 142 in FIG. 1. In some implementations, the preset pages are fast write pages, which are written faster than other pages in NVM 140, 142. In some implementations, initializing the one or more preset pages includes erasing any data previously stored in the pages. In some implementations, initializing the one or more preset pages includes designating the pages as pages reserved for power fail operations.

In some embodiments, prior to performing the soft power fail operation on the first section of the storage device (704), the storage device (1) charges (706) an energy storage device, (2) determines (708) whether the energy storage device meets a minimum charge level threshold within a predefined charge time, and (3) in accordance with a determination that the energy storage device does not meet the minimum charge level threshold in the predefined charge time, performs (710) a power fail error operation. In some implementations, the energy storage device is charged using a higher voltage than the power supply voltage provided to the storage device (e.g., using $V_{holdup}$ 406 in FIG. 4). In some implementations, the energy storage device is charged with dynamic inrush current control. In some implementations, performing the power fail error operation includes preventing operation of the storage device. In some implementations, performing the power fail error operation includes issuing a warning (e.g., asserting an error signal) to the host system (e.g., computer system 110, FIG. 1). For example, if the minimum charge level threshold is at or above 98% (or, alternatively, 95% or 90%) of charge capacity, supervisory module monitors the energy storage device to ensure the capacitor(s) in the energy storage device are charged to at least 98% (or, alternatively, 95% or 90%) of charge capacity. In some implementations, the power fail error operation includes performing one or more remedial actions (e.g., further charging the energy storage device). In some implementations, an energy storage device module (e.g., energy storage device module 310, FIG. 3) is used to monitor the energy storage device to ensure capacitors in the energy storage device are charged to at least the minimum charge level threshold, as described above with respect to FIG. 4.

The storage device performs (712) a soft power fail operation on a first section of the storage device. In some implementations, one or more power fail modules (e.g., power fail module 318, FIG. 3) are used to perform the soft power fail operation. For example, in accordance with some implementations, the first section of the storage device includes NVM controller 130-1 and NVMs 140 in FIG. 1.

The soft power fail operation includes signaling (714) a power test condition to a first controller (e.g., storage controller 128, FIG. 1) on the storage device. In some implementations, a signal module (e.g., signal module 320, FIG. 3) is used to signal the power test condition, as described above with respect to FIG. 3. For example, in accordance with some implementations, PCP 202 signals the power test condition to storage controller 128 via communication bus 224. In some implementations, the first controller on the storage device maps double data rate (DDR) interface commands to serial advance technology attachment (SATA) interface commands. For example, a memory controller (e.g., storage controller 128, FIG. 1) maps double data rate type three (DDR3) interface commands to SATA interface commands. In some implementations, a memory controller (e.g., storage controller 128, FIG. 1) uses a defined interface standard, such as DDR3, to communicate with a host interface (e.g., host interface 122, FIG. 1) and uses a defined interface standard, such as SATA, to communicate with other controllers on the storage device (e.g., NVM controllers 130, FIG. 1).

In some embodiments, the first controller on the storage device is a memory controller and, in response to the power test signal, the first controller asserts (716) a hardening done signal and ignores power fail errors (e.g., corrupted SATA link errors) received from the one or more controllers (e.g., NVM controllers 130, FIG. 1). In some implementations, in response to the power test signal, the memory controller buffers inputs from the host (e.g., computer system 110, FIG. 1). In some implementations, in response to the power test signal, the memory controller refuses inputs from the host. In some implementations, the first controller ignores power fail errors while the power test signal is asserted. In some implementations, the first controller ignores power fail errors until a second signal is received indicating the power test is complete. For example, in FIG. 1, in response to the power test signal received from supervisory module 126 via communication bus 148, storage controller 128 disregards power fail-related errors received from NVM controllers 130 (e.g., NVM controller 130-1 through NVM controller 130-m).

The soft power fail operation further includes providing (718) one or more controllers (e.g., NVM controllers 130, FIG. 1) with power from an energy storage device (e.g., energy storage device 205, FIG. 2), where the energy storage device is distinct from a power supply used during normal operation of the storage device. In some implementations, the one or more NVM controllers are flash controllers. In other implementations, the one or more NVM controllers control one or more other types of non-volatile storage devices. In some implementations, the energy storage device is utilized during power fail operations. In some implementations, providing the one or more controllers with power from an energy storage device includes not providing the one or more controllers with power from the power supply used during normal operation. In some implementations, providing the one or more controllers with power from the energy storage device comprises switching a power supply line (e.g., $V_{switched}$ 408, FIG. 4). For example, in accordance with some implementations, the one or more controllers are powered via $V_{switched}$ 408, FIG. 4. In this example, providing power from the energy storage device includes switching transistor 410 off to stop providing voltage from $V_{dd}$ 402 and switching transistor 412 on to provide voltage from energy storage device 205.

In some embodiments, the energy storage device (e.g., energy storage device 205, FIG. 2) comprises (720) one or more capacitors. In some implementations, the energy storage device includes one or more inductors or any other passive elements that store energy.

The soft power fail operation further includes signaling (722) a power fail condition to the one or more controllers on the storage device. For example, in FIG. 2, PFAIL control module 208 signals a power fail condition to NVM controllers 130 (e.g., NVM controller 130-1 through NVM controller 130-m) via PFAIL lines 230. In some implementations, signaling a power fail condition to the one or more controllers includes separately signaling each of the one or more controllers. In some implementations, the separate signaling is utilized to perform a sequential sequence of data hardening operations (sometimes called controller-level power fail operations). In some implementations, the separate signaling is utilized to perform a combination of sequential and parallel sequences of data hardening operations.

In response to the power fail condition, each of the one or more controllers performs (724) a data hardening operation. In some embodiments, performing the data hardening operation includes generating (726) a hardening done signal (e.g., the controller generating a hardening data signal when it completes transferring data held in volatile memory of (or associated with) the controller to non-volatile memory). For example, in FIG. 2, NVM controllers 130 (e.g., NVM controller 130-1 through NVM controller 130-m) send the hardening done signal to PCP 202 via PFAIL lines 226.

In some embodiments, performing the data hardening operation includes transferring (728) data held in the volatile memory of the storage device to the non-volatile memory of the storage device. In some implementations, the non-volatile memory includes a single NVM device (e.g., NVM 140-1, FIG. 1), while in other implementations the non-volatile memory includes a plurality of NVM devices. In some implementations, the non-volatile memory includes NAND-type flash memory and/or NOR-type flash memory. In other embodiments, the non-volatile memory comprises one or more other types of non-volatile storage devices.

In some implementations, power fail modules of the one or more controllers (e.g., power fail module 514, FIG. 5 and/or power fail module 614, FIG. 6) are used to transfer data held in volatile memory to non-volatile memory, as described above with respect to FIGS. 5-6. In some implementations, transferring data held in volatile memory of the storage device to non-volatile memory of the storage device includes transferring data (e.g., volatile data 518, FIG. 5) from the memory controller (e.g., storage controller 128, FIG. 1) to the one or more NVM controllers (e.g., NVM controllers 130, FIG. 1); and transferring data (e.g., volatile data 618, FIG. 6) from the one or more NVM controllers (e.g., NVM controllers 130, FIG. 1) to the non-volatile memory (e.g., NVM devices 140 and/or 142, FIG. 1). In some implementations, data transferred from the memory controller to the one or more NVM controllers includes data in flight from the host interface (e.g., host interface 122, FIG. 1) to the memory controller, data that has been signaled to the host (e.g., computer system 110, FIG. 1) as saved (e.g., stored in a non-volatile store or write cache), and/or metadata stored in volatile memory in the memory controller. In some implementations, a transfer module (e.g., transfer module 516, FIG. 5) is used to transfer data from the memory controller to the one or more NVM controllers, as described above with respect to FIG. 5. In some implementations, data transferred from the one or more NVM controllers to non-volatile memory includes data in flight to the one or more NVM controllers and/or metadata stored in volatile memory in the one or more NVM controllers (e.g., unwritten parity data, information about the current age of the NVM (e.g., flash memory) devices, translation tables, etc.). In some implementations, a transfer module (e.g., transfer module 616, FIG. 6) is used to transfer data from the one or more NVM controllers to non-volatile memory, as described above with respect to FIG. 6.

In some embodiments, transferring data held in the volatile memory of the storage device to the non-volatile memory of the storage device includes utilizing (730) the one or more preset pages (e.g., enough pages to store 2 MB of data) in the non-volatile memory. In some implementations, the non-volatile memory includes fast pages and slow pages (e.g., 50% of the pages are fast pages and the other 50% are slow pages) and each of the one or more preset pages is a fast page. In some implementations, using fast pages to transfer data is at least three times faster than using slow pages. In some implementations, the one or more preset pages comprise a superpage. In some embodiments, performing the data hardening operation further includes installing firmware, such as a firmware update, on at least a subset of the one or more controllers.

In some embodiments, performing the data hardening operation includes resetting (732) the one or more controllers. In some implementations, each of the one or more controllers (e.g., NVM controllers 130, FIG. 1) signal to supervisory module (e.g., supervisory module 126, FIG. 1) when it has completed transferring data (e.g., by asserting a hardening done signal). When the supervisory module receives this signal, it then resets the respective controller. In some implementations, resetting the respective controller puts the controller in a predefined low power state. In some implementations, the reset functionality is disabled while data is being transferred to non-volatile memory (e.g., the supervisory module prevents the controller from being reset when the controller is transferring data held in volatile memory to non-volatile memory). In some implementations, a reset module in the PCP (e.g., reset module 322, FIG. 3) in conjunction with a reset module in the respective controller (e.g., reset module 612, FIG. 6) is used to reset the controller subsequent to transferring data, as described above with respect to FIGS. 3-6. For example, in accordance with some implementations, supervisory module 126 in FIG. 1 resets NVM controller 130-1 via reset signal 144-1.

In some embodiments, performing the data hardening operation includes removing (734) power from the one or more controllers. In some implementations, power is removed by allowing the energy storage device (e.g., energy storage device 205, FIG. 2) to reach a discharged state. In some implementations, a power removal module (e.g., power removal module 324, FIG. 3) is used to remove power from the one or more controllers on the storage device, as described above with respect to FIG. 3. In some implementations, removing power from a controller comprises resetting the controller (e.g., using reset module 322, FIG. 3). In some implementations, removing power from the one or more controllers includes resetting each controller subsequent to transferring data. In some implementations, the first controller (e.g., storage controller 128, FIG. 1) is in a separate power domain from the one or more NVM controllers (e.g., NVM controller 130, FIG. 1). Thus, power may be removed from the one or more controllers without removing power from the first controller. These independent power domains allow supervisory module (e.g., supervisory module 126, FIG. 1) to selectively remove power from the various controllers on the storage device (e.g., storage device 120, FIG. 1). By selectively removing power to controllers as they are ready, the supervisory module preserves the power stored in the energy storage device (e.g., energy storage device 205, FIG. 2). In some implementations, the one or more controllers share the same power domain. In some embodiments, the data hardening operation further includes, subsequent to removing power from the one or more controllers, restoring power to the one or more controllers. In some implementations, the power is restored to the one or more controllers in parallel. In some implementations, the power is restored in a predefined sequence.

In some embodiments, the aforementioned one or more controllers communicate (736) with the first controller and correspond to the first section of the storage device. For example, in accordance with some implementations, the one or more controllers comprise NVM controller 130-1 in FIG. 1, the first controller is storage controller 128, and the first section of the storage device includes NVM controller 130-1 and NVMs 140.

In some embodiments, providing the one or more controllers with power from the energy storage device and signaling the power fail condition to the one or more controllers on the storage device are done simultaneously (738). In some implementations, supervisory module (e.g., supervisory module 126, FIG. 1) switches on transistor 412 to provide power from energy storage device 205 to the one or more controllers and asserts the power fail condition (e.g., via PFAIL line 230, FIG. 2) in the same clock cycle. In some implementations, PCP 202 enters a power fail state, which includes signaling the power fail condition (e.g., to PFAIL control module 208, FIG. 2) and signaling a power switch condition (e.g., to Power Storage and Distribution module 204, FIG. 2). In some implementations, the storage device provides the one or more controllers with power from the energy storage device before signaling the power fail condition to the one or more controllers on the storage device. In some implementations, the storage device provides the one or more controllers with power from the energy storage device after signaling the power fail condition to the one or more controllers on the storage device (e.g., on the next clock cycle). In some implementations, providing the one or more controllers with power from the energy storage device and signaling the power fail condition to the one or more controllers on the storage device are done asynchronously.

The soft power fail operation further includes resuming (740) normal operation on the first section of the storage device. In some embodiments, the storage device resumes normal operation on the first section of the storage device in response to receiving (742) a respective hardening done signal from at least one of the one or more controllers. For example, in accordance with some implementations, the one or more controllers comprise NVM controller 130-1 through NVM controller 130-m in FIG. 1 and normal operations on the first section of storage device 120 resume in response to PCP 202 receiving at least one hardening done signal via PFAIL lines 226-1 through 226-m in FIG. 2.

In some embodiments, resuming normal operation on the first section of the storage device includes (744) bringing the energy storage device to a charged state. For example, in accordance with some implementations, energy storage device 205 in FIG. 4 is charged using $V_{holdup}$ 406.

In some embodiments, resuming normal operation on the first section of the storage device includes providing (746) the one or more controllers with the power supply used during normal operation of the storage device. In some implementations, Power Storage and Distribution module 204 switches off transistor 412 and switches on transistor 410 (FIG. 4) to provide power from $V_{dd}$ 402 to the one or more controllers. In some implementations, Power Storage and Distribution module 204 switches off transistor 412 and switches on transistor 410 in response to a power switch condition received from PCP 202 via communication bus 216.

In some embodiments, performing the soft power fail operation on the first section of the storage device includes bringing (748) the energy storage device to a discharged state and the storage device resuming normal operation on the first section of the storage device subsequent (750) to the storage device reaching the discharged state. In some implementations, the discharged state is a zero energy state. In some implementations, the energy storage device is a reserve energy storage device. In some implementations, the reserve energy storage device is separate from the storage device (e.g., storage device 120). In some implementations, the storage device discharges the energy storage device (e.g., energy storage device 204, FIG. 2) subsequent to removing power from the one or more controllers (e.g., NVM controllers 130, FIG. 1) on the storage device (e.g., storage device 120, FIG. 1). In some implementations, discharging the energy storage device includes discharging one or more capacitors of the energy storage device. In some implementations, a discharge module (e.g., discharge module 328, FIG. 3) is used to discharge the energy storage device, as described above with respect to FIG. 3.

In some embodiments, the storage device performs the soft power fail operation on the first section of the storage device in response to detecting (752) an error condition. In some implementations, the error condition is detected by the supervisory module (e.g., supervisory module 126, FIG. 1). In some implementations, the error condition is detected by the PCP (e.g., PCP 202, FIG. 2). In some implementations, the error condition is detected by one or more of the controllers.

In some embodiments, the storage device performs the soft power fail operation on the first section of the storage device in response to a received command. In some implementations, the received command corresponds to a request from a host to initiate a diagnostics mode. In some implementations the received command is received by the supervisory module (e.g., supervisory module 126). In some implementations, the received command is received via the host interface (e.g., host interface 122, FIG. 1). In some implementations, the received command corresponds to a command sent from the host (e.g., computer system 110, FIG. 1).

In some embodiments, the soft power fail operation is controlled by (756) a PCP (e.g., PCP 202, FIG. 2) on the storage device. In some embodiments, the soft power fail operation is controlled by the supervisory module (e.g., supervisory module 126).

In some embodiments, during the soft power fail operation, the one or more controllers operate (758) at higher speeds (e.g., 2 or 3 times faster) than during normal operation. For example, the one or more controllers operate at higher speeds by utilizing only fast pages in non-volatile memory. In some implementations, during the soft power fail operation, the one or more controllers write to non-volatile memory in parallel. In some implementations, the one or more controllers operate at higher speeds during power fail operations in order to complete the power fail operation before the energy storage device reaches a discharged state.

In some embodiments, during the soft power fail operation, the one or more controllers draw (760) more power (e.g., 2 times more power) than during normal operation. For example, during the soft power fail operation, the one or more controllers draw more power by operating at higher speeds. In some implementations, the one or more controllers are able to draw more power because the power is being provided by the energy storage device (e.g., energy storage device 205, FIG. 2). In some implementations, the one or more controllers draw more power than is available when power is provided by the power supply used during normal operation of the storage device (e.g., $V_{dd}$ 402, FIG. 4). In some implementations, the one or more controllers draw more power because the one or more controllers write to more non-volatile memory devices in parallel than during normal operation. In some implementations, the one or more controllers draw more power because the one or more controllers operate at higher speeds than during normal operation.

In some embodiments, performing the soft power fail operation includes recording (762) time elapsed between signaling the power fail condition to a respective controller and receiving the corresponding hardening done signal from the respective controller. In some implementations, the recorded time is stored in NVM (e.g., NVM 140-1, FIG. 1) on the storage device. In some implementations, the recorded time is sent to the host (e.g., computer system 110, FIG. 1).

In some embodiments, in accordance with a determination that the time elapsed exceeds (764) a predetermined threshold, the storage device performs a power fail error operation. In some implementations, the power fail error operation includes recording the time elapsed and an error message in a log. In some implementations, the log is in the PCP (e.g., PCP 202, FIG. 2). In some implementations, the log is in an NVM controller (e.g., NVM controller 130-1, FIG. 1). In some implementations, the power fail error operation includes recording the time elapsed and an error message in both the PCP and the NVM controller. In some implementations, the power fail error operation includes issuing a warning (e.g., asserting an error signal) to the host system (e.g., computer system 110, FIG. 1). In some implementations, the warning is communicated with the host system through a SPD device (e.g., SPD device 203, FIG. 2) or a SPD bus controller. In some implementations, the power fail error operation includes preventing the respective controller from being used in normal operation. In some implementations, the power fail error operation includes resetting the respective controller. In some implementations, the power fail error operation includes preventing the storage device from resuming normal operations.

In some embodiments, the storage device records (766) data regarding the soft power fail operation to non-volatile memory (e.g., NVM 140-1, FIG. 1). In some implementations, recording data regarding the soft power fail operation includes: (1) recording power supply voltages (e.g., $V_{dd}$ or $V_{SPD}$), (2) recording which signal or event triggered the soft power fail operation, (3) recording the real time when the soft power fail event happened (e.g., Monday, Oct. 15, 2013, at 12:03:17 AM), (4) recording the length of time the soft power fail operation took to complete, (5) recording whether the soft power fail operation was successful, (6) recording information regarding the quality of an energy storage device (e.g., energy storage device 205, FIG. 2), and (7) recording other information regarding the soft power fail operation (e.g., whether firmware was installed). In some implementations, only a subset of the above listed information is recorded (e.g., two or more, three or more, four or more, or five or more of the above listed information are recorded).

In some embodiments, during the soft power fail operation, the one or more controllers (e.g., NVM controllers 130, FIG. 1) write (768) to more non-volatile memory devices (e.g., NVM 140 and/or NVM 142, FIG. 1) in parallel than during normal operation. In some implementations, the bandwidth of the storage device is limited by the number of active NVM devices (e.g., NVM 140 and/or NVM 142, FIG. 1). Thus, the bandwidth of the storage device is increased by writing to more NVM devices in parallel. Increasing the bandwidth of the storage device helps ensure that the soft power fail operation completes before the power supplied by the energy storage device (e.g., energy storage device 205, FIG. 2) is exhausted. In some implementations, the number of active NVM devices (e.g., flash memory devices) at a given time is determined at least in part by firmware installed on the storage device (e.g., storage device 120, FIG. 1). In some implementations, the number of active NVM devices at a given time is controlled by one or more controllers (e.g., NVM controllers 130 and/or storage controller 128, FIG. 1). In some implementations, the number of active NVM devices at a given time is controlled by firmware scheduling in the one or more controllers (e.g., firmware stored in memory 606 and executed by processor(s) 602, FIG. 6). In some implementations, the number of active NVM devices at a given time is limited by the power supply utilized by the storage device at that time (e.g., limited by the power supply's maximum output current). In some implementations, the energy storage device (e.g., energy storage device 205, FIG. 2) is capable of supplying more power (e.g., has a higher maximum output current) than the power supply used during normal operation of the storage device (e.g., $V_{dd}$ 402, FIG. 4). In some implementations, the power provided by the energy storage device during the soft power fail operation allows for the one or more controllers to write to more non-volatile memory devices in parallel than is allowed during normal operation of the storage device. In some implementations, writing to said more non-volatile memory devices in parallel draws more power than is available when power is provided by the power supply used during normal operation of the storage device.

In some implementations, with respect to any of the methods described above, the non-volatile memory is a single NVM device (e.g., flash memory device), while in other implementations, the non-volatile memory includes a plurality of NVM devices (e.g., flash memory devices).

In some implementations, with respect to any of the methods described above, a storage device includes (1) an interface for coupling the storage device to a host system, (2) a plurality of controllers, each of the plurality of controllers configured to transfer data held in volatile memory to non-volatile memory, and (3) supervisory module including one or more processors and an energy storage device, the storage device configured to perform or control performance of any of the methods described above.

In some implementations, with respect to any of the methods described above, a storage device includes (1) an interface for coupling the storage device to a host system, (2) a plurality of controllers, each of the plurality of controllers configured to transfer data held in volatile memory to non-volatile memory, and (3) supervisory module including one or more processors and an energy storage device, the supervisory module configured to perform or control performance of any of the methods described above.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of protecting data in a storage device comprising volatile memory and non-volatile memory, the method comprising:

performing a soft power fail operation on a first section of the storage device, the soft power fail operation including:
  signaling a power test condition to a first controller on the storage device;
  providing one or more controllers with power from an energy storage device, wherein the energy storage device is distinct from a power supply used during normal operation of the storage device;
  signaling a power fail condition to the one or more controllers on the storage device;
    wherein the one or more controllers communicate with the first controller and correspond to the first section of the storage device; and
    wherein, in response to the power fail condition, each of the one or more controllers performs a data hardening operation; and
  resuming normal operation on the first section of the storage device.

2. The method of claim 1, wherein the storage device provides the one or more controllers with power from the energy storage device and signals the power fail condition to the one or more controllers on the storage device simultaneously.

3. The method of claim 1, wherein performing the data hardening operation includes generating a hardening done signal.

4. The method of claim 3, further comprising resuming normal operation on the first section of the storage device in response to receiving a respective hardening done signal from at least one of the one or more controllers.

5. The method of claim 1, wherein performing the data hardening operation includes transferring data held in the volatile memory of the storage device to the non-volatile memory of the storage device.

6. The method of claim 5, wherein transferring data held in the volatile memory of the storage device to the non-volatile memory of the storage device includes utilizing one or more preset pages in the non-volatile memory.

7. The method of claim 6, further comprising, prior to performing the soft power fail operation on the first section of the storage device, initializing the one or more preset pages.

8. The method of claim 1, wherein, during the soft power fail operation, the one or more controllers operate at higher speeds than during normal operation.

9. The method of claim 1, wherein, during the soft power fail operation, the one or more controllers write to more non-volatile memory devices in parallel than during normal operation.

10. The method of claim 1, wherein, during the soft power fail operation, the one or more controllers draw more power than during normal operation.

11. The method of claim 1, wherein performing the data hardening operation includes resetting the one or more controllers.

12. The method of claim 1, wherein performing the data hardening operation includes removing power from the one or more controllers.

13. The method of claim 1, wherein performing the soft power fail operation includes recording time elapsed between signaling the power fail condition to a respective controller and receiving a corresponding hardening done signal from the respective controller.

14. The method of claim 13, further comprising, in accordance with a determination that the time elapsed exceeds a predetermined threshold, performing a power fail error operation.

15. The method of claim 1, further comprising recording data regarding the soft power fail operation to non-volatile memory.

16. The method of claim 1, further comprising performing the soft power fail operation on the first section of the storage device in response to detecting an error condition.

17. The method of claim 1, further comprising performing the soft power fail operation on the first section of the storage device in response to a received command.

18. The method of claim 1, wherein the energy storage device comprises one or more capacitors.

19. The method of claim 1, further comprising:
  prior to performing the soft power fail operation on the first section of the storage device:
    charging the energy storage device;
    determining whether the energy storage device meets a minimum charge level threshold within a predefined charge time; and
    in accordance with a determination that the energy storage device does not meet the minimum charge level threshold in the predefined charge time, performing a power fail error operation.

20. The method of claim 1, wherein performing the soft power fail operation on the first section of the storage device includes bringing the energy storage device to a discharged state; and
  the method further comprises resuming normal operation on the first section of the storage device subsequent to the storage device reaching the discharged state.

21. The method of claim 20, wherein resuming normal operation on the first section of the storage device includes bringing the energy storage device to a charged state.

22. The method of claim 1, wherein resuming normal operation on the first section of the storage device includes providing the one or more controllers with the power supply used during normal operation of the storage device.

23. The method of claim 1, wherein the soft power fail operation is controlled by a power control processor (PCP) of the storage device.

24. The method of claim 1, wherein the first controller on the storage device is a memory controller; and
  wherein, in response to the power test signal, the first controller asserts a hardening done signal and ignores power fail errors received from the one or more controllers.

25. A storage device operable to protect data, comprising:
  an interface for coupling the storage device to a host system;
  a plurality of controllers; and
  a supervisory module including one or more processors and an energy storage device, the supervisory module configured to:
    perform a soft power fail operation on a first section of the storage device, the soft power fail operation including:
      signaling a power test condition to a first controller of the plurality of controllers on the storage device;
      providing one or more controllers of the plurality of controllers with power from the energy storage device, wherein the energy storage device is distinct from a power supply used during normal operation of the storage device;
      signaling a power fail condition to the one or more controllers on the storage device;
        wherein the one or more controllers communicate with the first controller and correspond to the first section of the storage device; and wherein, in response to the power fail condition, each of the one or more controllers performs a data hardening operation; and resuming normal operation on the first section of the storage device.

26. The storage device of claim 25, wherein the storage device is configured to provide the one or more controllers with power from the energy storage device and signal the power fail condition to the one or more controllers on the storage device simultaneously.

27. A non-transitory computer readable storage medium, storing one or more programs for execution by one or more processors of a storage device having a plurality of controllers and supervisory module, the one or more programs including instructions for:

performing a soft power fail operation on a first section of the storage device, the soft power fail operation including:

signaling a power test condition to a first controller on the storage device;

providing one or more controllers with power from an energy storage device, wherein the energy storage device is distinct from a power supply used during normal operation of the storage device;

signaling a power fail condition to the one or more controllers on the storage device;

wherein the one or more controllers communicate with the first controller and correspond to the first section of the storage device; and wherein, in response to the power fail condition, each of the one or more controllers performs a data hardening operation; and resuming normal operation on the first section of the storage device.

\* \* \* \* \*